(12) United States Patent
Xiao et al.

(10) Patent No.: US 10,091,698 B2
(45) Date of Patent: Oct. 2, 2018

(54) INTER-RADIO ACCESS TECHNOLOGY HANDOVER METHOD, CORRESPONDING DEVICE, AND COMMUNICATIONS SYSTEM

(71) Applicant: Huawei Technologies Co., Ltd., Shenzhen (CN)

(72) Inventors: Dengkun Xiao, Beijing (CN); Jing Han, Beijing (CN); Jiandong Jin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 179 days.

(21) Appl. No.: 14/609,375

(22) Filed: Jan. 29, 2015

(65) Prior Publication Data

US 2015/0139195 A1 May 21, 2015

Related U.S. Application Data

(63) Continuation of application No. PCT/CN2012/079357, filed on Jul. 30, 2012.

(51) Int. Cl.
*H04W 36/22* (2009.01)
*H04W 36/30* (2009.01)
*H04W 36/24* (2009.01)
*H04W 36/00* (2009.01)

(52) U.S. Cl.
CPC ........... *H04W 36/22* (2013.01); *H04W 36/24* (2013.01); *H04W 36/30* (2013.01); *H04W 36/0083* (2013.01)

(58) Field of Classification Search
CPC .............................. H04W 36/22; H04W 36/30
See application file for complete search history.

(56) References Cited

U.S. PATENT DOCUMENTS

| | | | | |
|---|---|---|---|---|
| 6,219,550 B1* | 4/2001 | Kanerva | ............... | H04W 36/26 455/226.1 |
| 6,885,866 B1* | 4/2005 | Wikstedt | ........... | H04W 36/0055 455/436 |
| 7,890,104 B2 | 2/2011 | Kröner et al. | | |
| 8,219,095 B2* | 7/2012 | Stephens | ............... | H04W 36/22 370/331 |
| 8,472,408 B2* | 6/2013 | Park | ...................... | H04W 36/22 370/332 |

(Continued)

FOREIGN PATENT DOCUMENTS

| | | |
|---|---|---|
| CN | 101202974 A | 6/2008 |
| CN | 101213857 A | 7/2008 |

(Continued)

*Primary Examiner* — Rasheed Gidado
(74) *Attorney, Agent, or Firm* — Slater Matsil, LLP

(57) ABSTRACT

An embodiment of the present invention provides a handover method, and embodiments of the present invention further provide a coordinator, a serving node, a target node, and a corresponding communications system. The method includes acquiring measurement results of a plurality of neighboring cells of a serving cell where a user equipment UE is located; acquiring information reflecting a load condition of at least one neighboring cell among the plurality of neighboring cells; and performing a handover decision according to the measurement results of the plurality of neighboring cells and the information reflecting the load condition of the at least one neighboring cell among the plurality of neighboring cells.

20 Claims, 19 Drawing Sheets

(56) References Cited

U.S. PATENT DOCUMENTS

| | | | |
|---|---|---|---|
| 8,755,800 B2* | 6/2014 | Yoon | H04W 36/30 455/436 |
| 8,842,633 B2* | 9/2014 | Dwyer | H04W 36/0083 370/331 |
| 8,954,075 B2* | 2/2015 | Paterson | C07K 14/195 370/331 |
| 9,148,824 B2* | 9/2015 | Diachina | H04W 36/0022 |
| 9,226,130 B2* | 12/2015 | Nylander | H04W 8/08 |
| 2007/0004445 A1 | 1/2007 | Dorsey et al. | |
| 2009/0207807 A1* | 8/2009 | Mahdi | H04L 12/66 370/331 |
| 2009/0253426 A1 | 10/2009 | Qiu et al. | |
| 2011/0053597 A1* | 3/2011 | Lee | H04W 36/22 455/436 |
| 2012/0149378 A1 | 6/2012 | Li et al. | |
| 2012/0170547 A1* | 7/2012 | Oprescu-Surcobe | H04W 36/0083 370/331 |
| 2012/0315900 A1 | 12/2012 | Wen | |
| 2013/0079009 A1* | 3/2013 | Aumann | H04W 16/02 455/436 |
| 2013/0137435 A1* | 5/2013 | Shi | H04W 36/20 455/436 |
| 2013/0337778 A1* | 12/2013 | Ye | H04W 36/0083 455/411 |
| 2014/0057627 A1* | 2/2014 | Hejazi | H04W 28/08 455/424 |
| 2014/0228029 A1* | 8/2014 | Wen | H04W 36/245 455/436 |
| 2015/0057003 A1 | 2/2015 | Dwyer et al. | |

FOREIGN PATENT DOCUMENTS

| | | |
|---|---|---|
| CN | 101374324 A | 2/2009 |
| CN | 101841858 A | 9/2010 |
| CN | 101895949 A | 11/2010 |
| CN | 101998564 A | 3/2011 |
| CN | 102415162 A | 4/2012 |

\* cited by examiner

INTER-RADIO ACCESS TECHNOLOGY HANDOVER METHOD, CORRESPONDING DEVICE, AND COMMUNICATIONS SYSTEM

This application is a continuation of International Application No. PCT/CN2012/079357, filed on Jul. 30, 2012, which is hereby incorporated by reference in its entirety.

TECHNICAL FIELD

The embodiments of present invention relates to the field of wireless communications, and in particular, to an inter-radio access technology handover method, a corresponding device, and a communications system.

BACKGROUND

With the rapid development of mobile communications, an operator needs to provide faster and richer services for users. In the evolution of networks and upgrade of networks, it can be foreseen that a 2G (2nd generation) network (such as a global system for mobile communications (GSM, Globe System for Mobile Communications) and an enhanced data rates for GSM evolution (EDGE, Enhanced Data rate for GSM Evolution)), a 3G (3rd generation) network (such as a wideband code division multiple access system (WCDMA) and a time division-synchronous code division multiple access system (TD-SCDMA)), and a long term evolution system (LTE) will be in a condition of coexistence within a long period of time and work together to provide a user with good communication service quality.

In a moving process of a user equipment (UE) or a mobile station (MS), an inter-radio access technology handover (inter-RAT handover) may occur, for example, a handover from an LTE system to a universal mobile telecommunications system (UMTS). For example, as shown in FIG. 1A, in a multi-mode system, a GSM has larger network coverage, inside which an LTE network is deployed for hot spot coverage. When a UE moves from an edge of a Cell1 to a Cell2, the UE needs to execute an inter-RAT handover.

Referring to FIG. 1B, by taking a handover of a UE from LTE to UMTS as an example, an existing handover process is as follows: 2.1) A serving cell configures a measurement configuration for a UE; 2.2) the UE reports measurement results of neighboring cells obtained through measurement to the serving cell; 2.3) the serving cell executes a handover decision to determine which target cell the UE is to be handed over to; 2.4) the serving cell sends a handover request to a core network MME (Mobility Management Entity); 2.5) the MME forwards a redirection request to a target serving GPRS support node (SGSN, Serving GPRS Support Node); 2.6) the target SGSN sends the redirection request to a radio network controller (RNC, radio network controller); 2.7) the RNC sends a redirection response to the target SGSN; 2.8) the target SGSN forwards the redirection response to the serving MME; 2.9) the serving MME sends a handover request response to a serving evolved base station (eNB, evolved Node B); 2.10) the serving eNB sends an RRC connection reconfiguration to the UE; and subsequently, the UE initiates access to the target cell.

In an existing inter-RAT handover, when a user equipment or a mobile station initiates a handover, a serving node makes a handover decision. However, the serving node does not know resource utilization conditions of cells of other mode and can only determine signal quality of other cells by using the measurement results reported by the user equipment or the mobile station. In this case, when signal quality of a target cell is good but a load is heavy, a handover to the target cell has a relatively high handover failure rate.

SUMMARY

Embodiments of the present invention provide an inter-RAT handover method, a corresponding device (including a coordinator (coordinator), a serving node, and a target node), and a communications system. Embodiments of present invention can increase an inter-RAT handover success rate.

According to a first aspect of the embodiments of the present invention, an embodiment of the present invention provides an inter-radio access technology handover method. The method includes acquiring measurement results of a plurality of neighboring cells of a serving cell where a user equipment UE is located; acquiring information reflecting a load condition of at least one neighboring cell among the plurality of neighboring cells; and performing a handover decision according to the measurement results of the plurality of neighboring cells and the information reflecting the load condition of the at least one neighboring cell among the plurality of neighboring cells.

According to a second aspect of the embodiments of the present invention, an embodiment of the present invention provides an inter-radio access technology handover method. The method includes, after a serving node of a serving cell where a UE is located makes a handover decision to determine a target cell, receiving, by a coordinator, a message which is for requesting resource preparation for a handover and is sent by the serving node; sending, by the coordinator, to a target node of the target cell, a message for requesting the target node to allocate a resource for redirection, and receiving a message which is for notifying the coordinator of a resource allocation result of the redirection and is sent by the target node after the target node allocates the resource for the redirection; and sending, by the coordinator, to the serving node, a message for notifying the serving node of the resource preparation on the target node.

According to a third aspect of the embodiments of the present invention, an embodiment of the present invention provides a network device with a number of modules. A first information processing module is configured to acquire measurement results of a plurality of neighboring cells of a serving cell where a UE is located. A second information processing module is configured to acquire information reflecting a load condition of at least one neighboring cell among the plurality of neighboring cells. A first deciding module is configured to perform a handover decision according to the measurement results of the plurality of neighboring cells and the information reflecting the load condition of the at least one neighboring cell among the plurality of neighboring cells.

According to a fourth aspect of the embodiments of the present invention, an embodiment of the present invention provides a coordinator that includes sending and receiving modules. The fourth receiving module is configured to receive a message which is for requesting resource preparation for a handover and is sent by a serving node, and a message which is for notifying the coordinator of a resource allocation result of redirection and is sent by target node after the target node allocates a resource for the redirection. The fifth sending module is configured to, after the fourth receiving module receives the message for requesting the resource preparation for the handover, send, to the target node, a message for requesting the target node to allocate the resource for the redirection, and configured to, after the fourth receiving module receives the message for notifying the coordinator of the resource allocation result of the redirection, send, to the serving node, a message for notifying the serving node of the resource preparation on the target noderedirection.

According to a fifth aspect of the embodiments of the present invention, an embodiment of the present invention provides a coordinator. A fifth receiving module is configured to receive a second handover notification sent by a serving node of a serving cell where a UE is located, where the second handover notification includes an identifier, and the identifier is used for notifying the coordinator to send, to the serving node, information reflecting a load condition of at least one neighboring cell among a plurality of neighboring cells of the serving cell where the UE is located. Information acquiring module is configured to acquire the information reflecting the load condition of the at least one neighboring cell among the plurality of neighboring cells. A sixth sending module is configured to send, to the serving node, a second handover notification response, so that the serving node determines a target node of a handover, where the second handover notification response includes the information reflecting the load condition of the at least one neighboring cell among the plurality of neighboring cells.

According to a sixth aspect of the embodiments of the present invention, an embodiment of the present invention provides a serving node. A sending module is configured to send, to a coordinator, a first handover notification, so that the coordinator determines a target node of a handover, where the first handover notification includes measurement results of a plurality of neighboring cells of a serving cell where the serving node is located. A seventh sending module is configured to receive a first handover notification response sent by the coordinator after the coordinator determines the target node, and/or, configured to, after the coordinator requests the target node to allocate a resource for redirection and the target node notifies the coordinator of a resource allocation result of the redirection, receive a message which is for notifying the serving node of resource preparation on the target node and is sent by the coordinator, where the first handover notification response includes an identifier of the target cell.

According to a seventh aspect of the embodiments of the present invention, an embodiment of the present invention provides a serving node. In a third receiving module is configured to receive measurement results which are of a plurality of neighboring cells of a serving cell where the serving node is located and are reported by a UE. A second deciding module is configured to determine a target node according to the measurement results of the plurality of neighboring cells. A ninth sending module is configured to, after the second deciding module determines the target node, send, to a coordinator, a message for requesting resource preparation for a handover, so that the coordinator requests the target node to allocate a resource for redirection. A ninth receiving module is configured to, after the target node notifies the coordinator of a resource allocation result of the redirection, receive a message which is for notifying the serving node of the resource preparation on the target node and is sent by the coordinator redirection.

According to an eighth aspect of the embodiments of the present invention, an embodiment of the present invention provides a target node. A 10th receiving module is configured to receive a message which is for requesting the target node to allocate a resource for redirection and is sent by a coordinator. A processing module is configured to, redirection after the tenth receiving module receives the message which is for requesting the target node to allocate the resource for the redirection and is sent by the coordinator, allocate the resource for the redirection to perform resource preparation for the redirection. A 10th sending module is configured to notify the coordinator of a resource allocation result of the redirection.

According to a ninth aspect of the embodiments of the present invention, an embodiment of the present invention provides a communications system. The communications system includes the serving node provided in the seventh aspect of the embodiments of the present invention, the coordinator provided in the fourth aspect of the embodiments of the present invention, and the target node provided in the eighth aspect of the embodiments of the present invention. In another embodiment the communications system includes the network device (the network device here is a serving node) provided in the third aspect of the embodiments of the present invention, the coordinator provided in the fifth aspect of the embodiments of the present invention, and the target node provided in the eighth aspect of the embodiments of the present invention. In another embodiment, the communication system includes the serving node provided in the sixth aspect of the embodiments of the present invention, the network device (the network device here is a coordinator) in the third aspect of the embodiments of the present invention, and the target node provided in the eighth aspect in the embodiments of the present invention.

Implementation of the embodiments of the present invention has the following beneficial effects. A coordinator or a serving node executes a handover decision by combining signal quality and load information of a neighboring cell, so as to increase an inter-RAT handover success rate. In addition, a coordinator is introduced in a communications system to receive and send relevant messages, so that a core network is not required for an inter-RAT handover process, thereby shortening a handover delay and increasing a handover success rate.

BRIEF DESCRIPTION OF THE DRAWINGS

To describe the technical solutions in the embodiments of the present invention or in the prior art more clearly, the following briefly introduces accompanying drawings required for describing the embodiments. Apparently, the accompanying drawings in the following description show merely some embodiments of the present invention, and a person of ordinary skill in the art may still derive other drawings according to these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the embodiments of present invention.

In implementation manners of the embodiments of present invention, a UE includes a terminal, an MS, a transceiver, and a client.

Figure 1A:
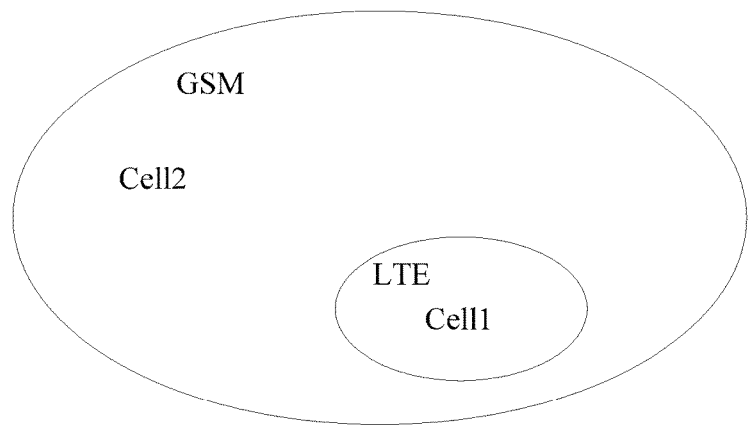
FIG. 1A is a coverage diagram of an existing multi-mode network.
Figure 1B:
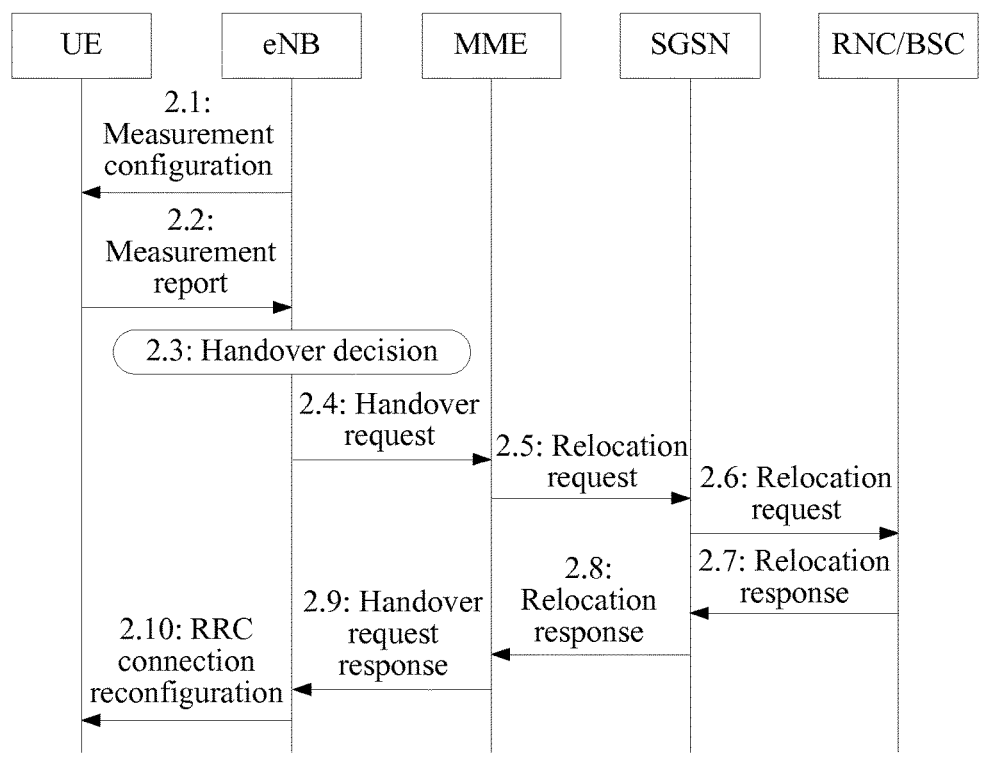
FIG. 1B is a schematic flow chart of an existing handover from LTE to UMTS.
Figure 2:
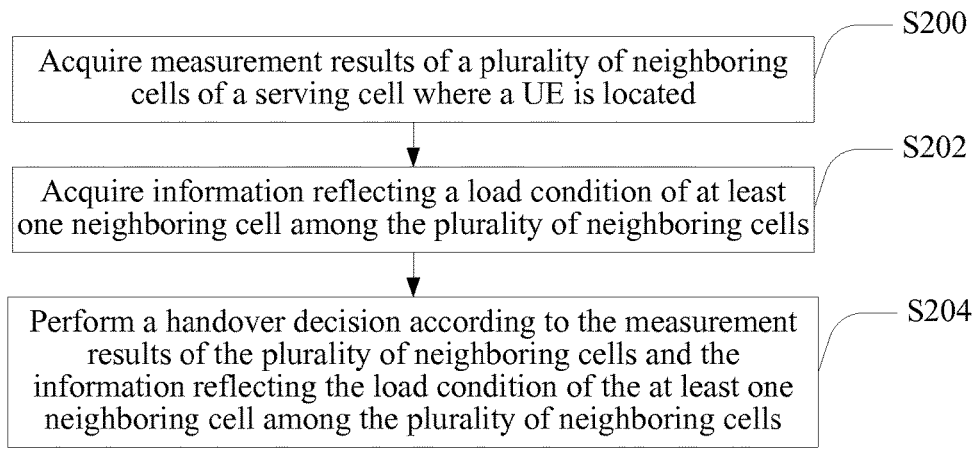
FIG. 2 is a schematic flow chart of an inter-RAT handover method according to an embodiment of the present invention.

FIG. 2 is a schematic flow chart of an inter-RAT handover method according to an embodiment of the present invention. The method includes the following steps.

S200. Acquire measurement results of a plurality of neighboring cells of a serving cell where a UE is located.

S202. Acquire information reflecting a load condition of at least one neighboring cell among the plurality of neighboring cells.

S204. Perform a handover decision according to the measurement results of the plurality of neighboring cells and the information reflecting the load condition of the at least one neighboring cell among the plurality of neighboring cells.

In an implementation manner of this embodiment, a serving node of the serving cell where the UE is located may directly receive a measurement report reported by the UE to acquire the measurement results, or a coordinator receives a first handover notification which includes measurement results and is sent by the UE to obtain the measurement results.

In an implementation manner of this embodiment, the information reflecting the load condition of the at least one neighboring cell among the plurality of neighboring cells may include: load information and remaining resource information of at least one neighboring cell among the plurality of neighboring cells, or a target cell list generated according to load information and remaining resource information of at least one neighboring cell among the plurality of neighboring cells. A coordinator may periodically acquire load information and remaining resource information of at least one neighboring cell among the plurality of neighboring cells (for example, the at least one neighboring cell periodically reports its load condition relevant information to the coordinator) and store (the storage may be selective, for example, the coordinator may only store load condition relevant information of a neighboring cell whose load condition reaches one threshold) the load information and remaining resource information.

The coordinator may also acquire, from at least one neighboring cell among the plurality of neighboring cells, load information and remaining resource information of the at least one neighboring cell after receiving a trigger message (for example, a second handover notification) sent by a serving node. The coordinator may also generate a target cell list (for example, the coordinator selects a neighboring cell whose load condition reaches one threshold to form a target cell list) according to the acquired load information and remaining resource information of the at least one neighboring cell. The serving node may acquire, from the coordinator, load information and remaining resource information of at least one neighboring cell among the plurality of neighboring cells (on such a basis, the serving node may generate a target cell list), or directly acquire, from the coordinator, the target cell list generated by the coordinator.

In an implementation manner of this embodiment, a coordinator or a serving node may determine signal quality of the plurality of neighboring cells (including: signal strength) according to the measurement results of the plurality of neighboring cells, and perform the handover decision in the following manners.

1) Select at least one neighboring cell whose signal quality reaches one first threshold and load condition reaches one second threshold at the same time, and then randomly select one as a target cell; or 2) Determine a set of neighboring cells whose load conditions reach one threshold, and then select one neighboring cell having best signal quality as a target cell; or 3) Determine a set A of neighboring cells whose signal quality reaches one first threshold, determine a set B of neighboring cells (for example, a target cell list) whose load conditions reach one second threshold, then acquire an intersection set of the set A and the set B, and make a selection according to an intersection set result.

Figure 3:
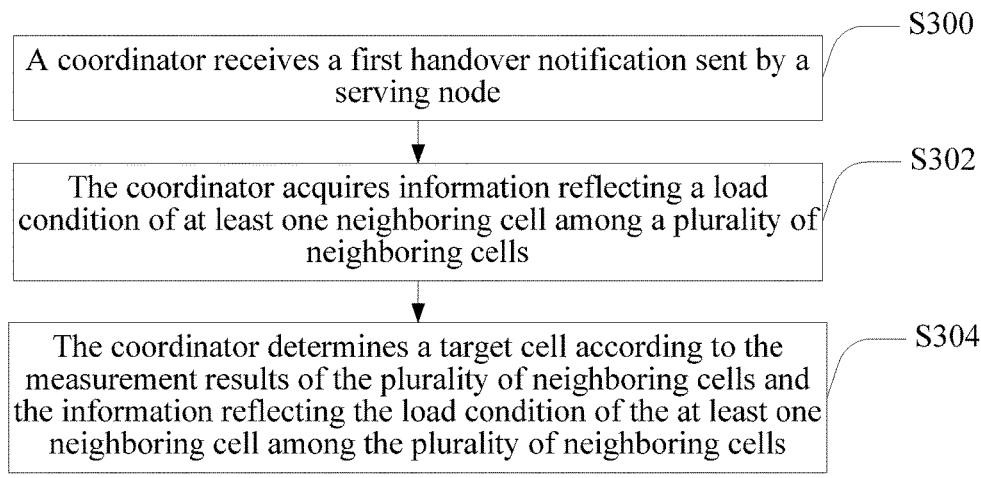
FIG. 3 is a schematic flow chart of an inter-RAT handover method according to an embodiment of the present invention.

In an embodiment of the present invention, a coordinator may be utilized to execute a handover decision. Referring to FIG. 3, FIG. 3 is a schematic flow chart of an inter-RAT handover method according to an embodiment of the present invention. The method includes the following steps.

S300. A coordinator receives a first handover notification sent by a serving node, where the first handover notification includes measurement results of a plurality of neighboring cells of a serving cell where a UE is located.

S302. The coordinator acquires information reflecting a load condition of at least one neighboring cell among the plurality of neighboring cells.

S304. The coordinator determines a target cell according to the measurement results of the plurality of neighboring cells and the information reflecting the load condition of the at least one neighboring cell among the plurality of neighboring cells.

The serving node may be an eNB, a base station (Node B), an RNC or a base station subsystem (BSS). A BSS includes a base station transceiver (BTS) and a base station controller (BSC). In the methods and devices of the embodiments of present invention, a BTS and a BSC may also serve as a serving node or a target node of the embodiments of present invention, respectively.

In the following, several specific schematic flow charts of an inter-RAT handover are combined to exemplarily describe an inter-RAT handover method in the embodiment of the present invention.

Figure 4:
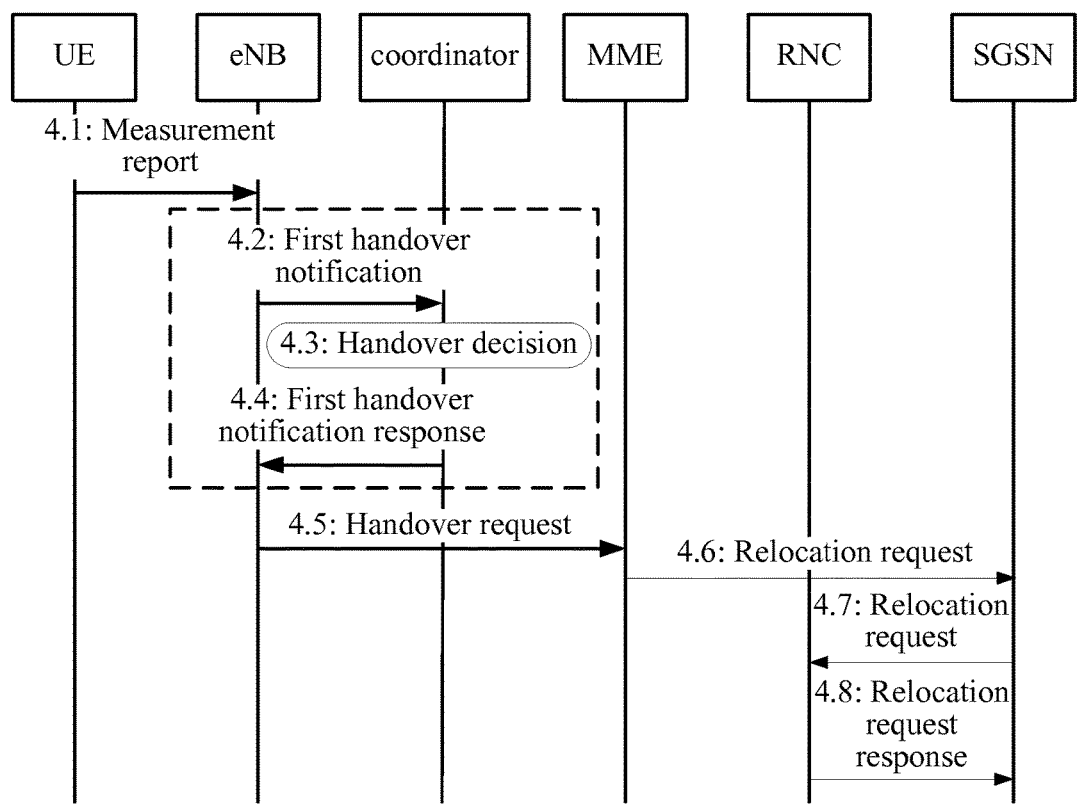
FIG. 4 is a schematic flow chart of a handover from LTE to UTRA according to an embodiment of the present invention.
Figure 5:
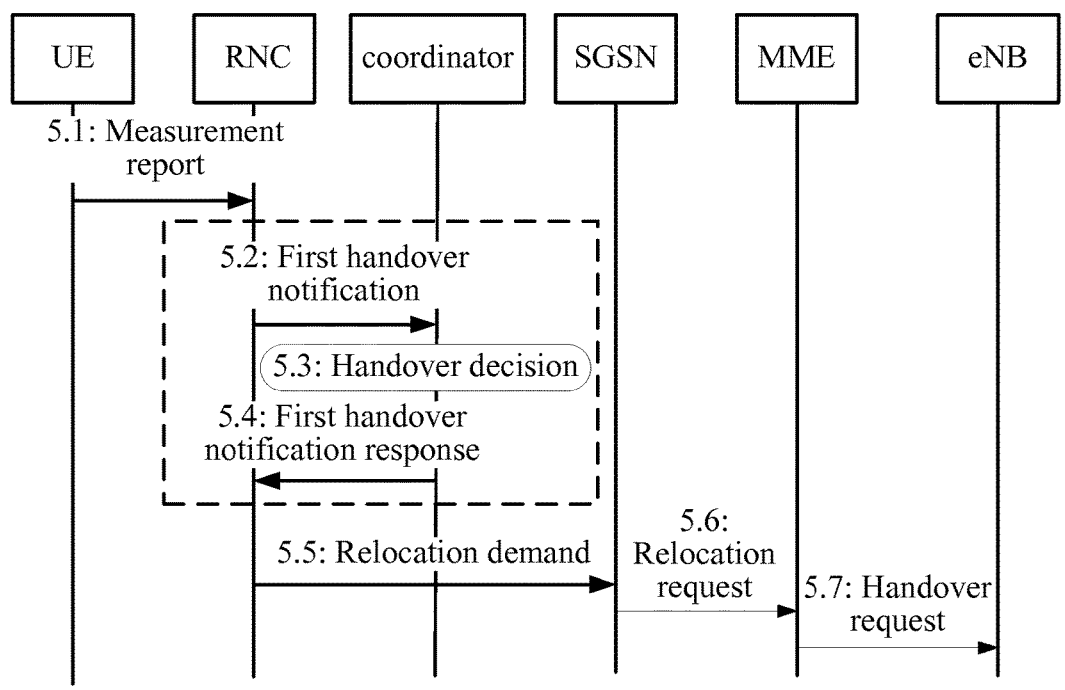
FIG. 5 is a schematic flow chart of a handover from UTRA to LTE according to an embodiment of the present invention.
Figure 6:
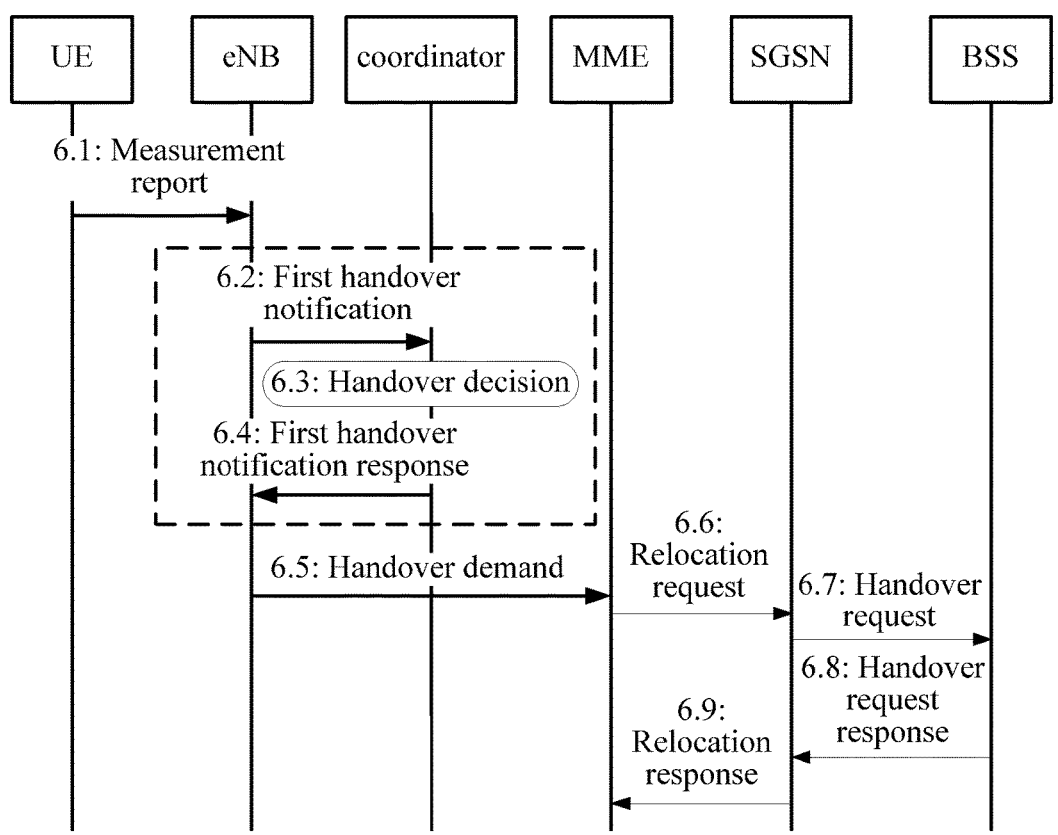
FIG. 6 is a schematic flow chart of a handover from LTE to GERAN according to an embodiment of the present invention.
Figure 7:
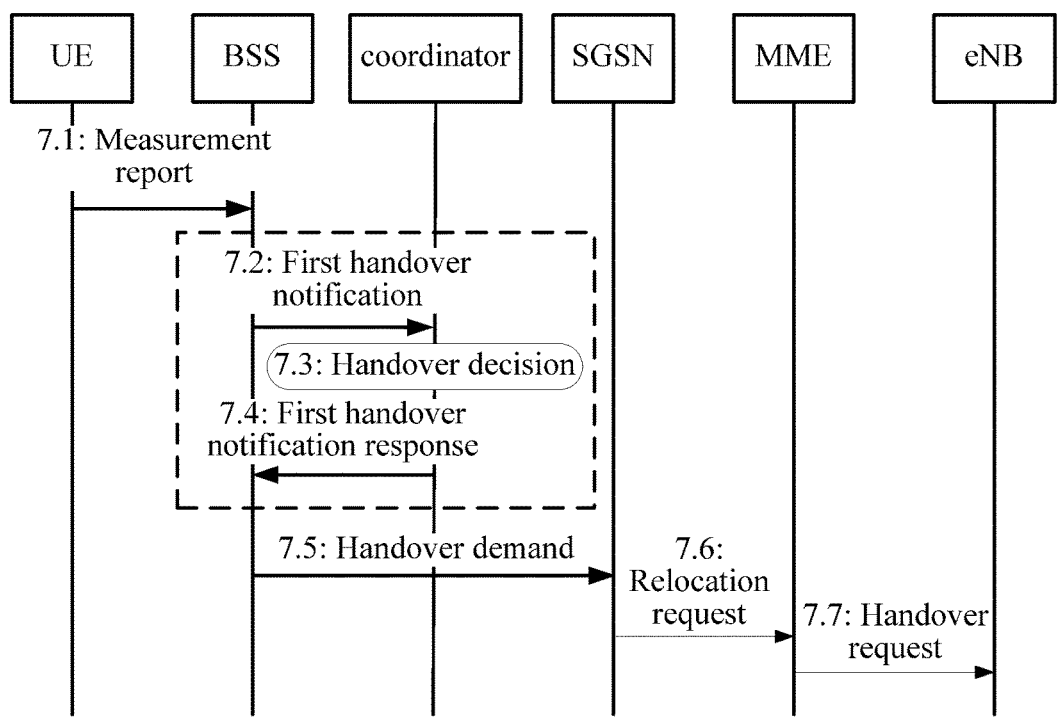
FIG. 7 is a schematic flow chart of a handover from GERAN to LTE according to an embodiment of the present invention.
Figure 8:
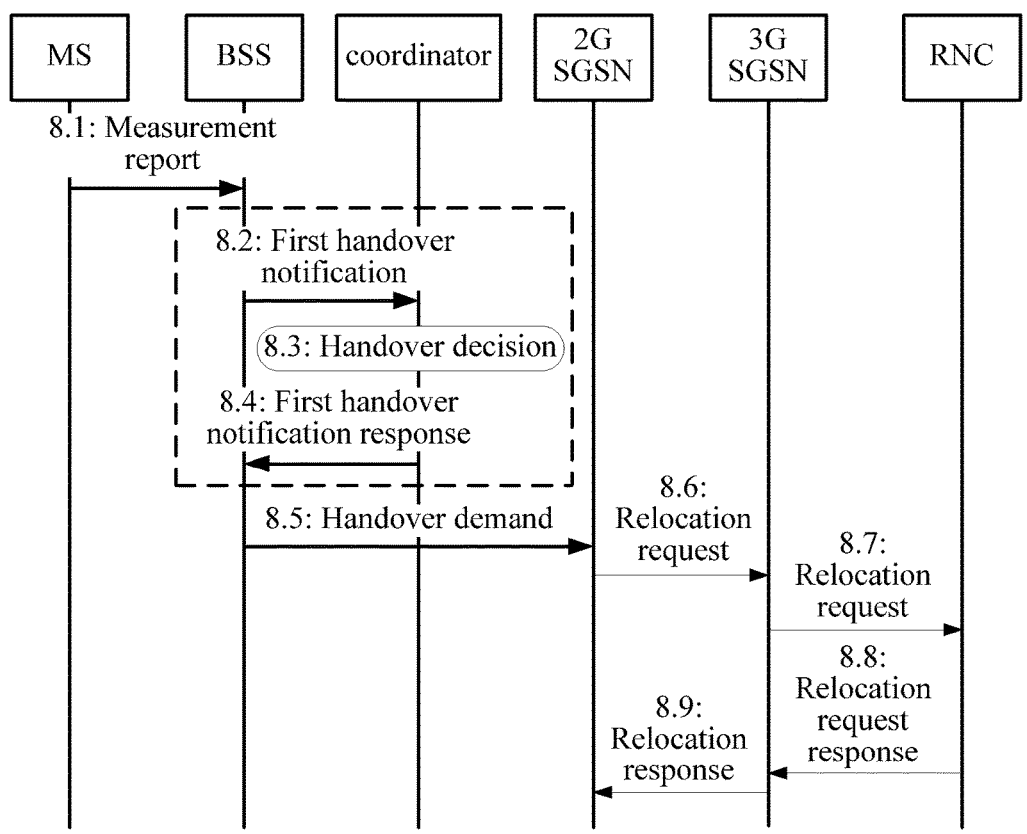
FIG. 8 is a schematic flow chart of a handover from GERAN to UTRA according to an embodiment of the present invention.
Figure 9:
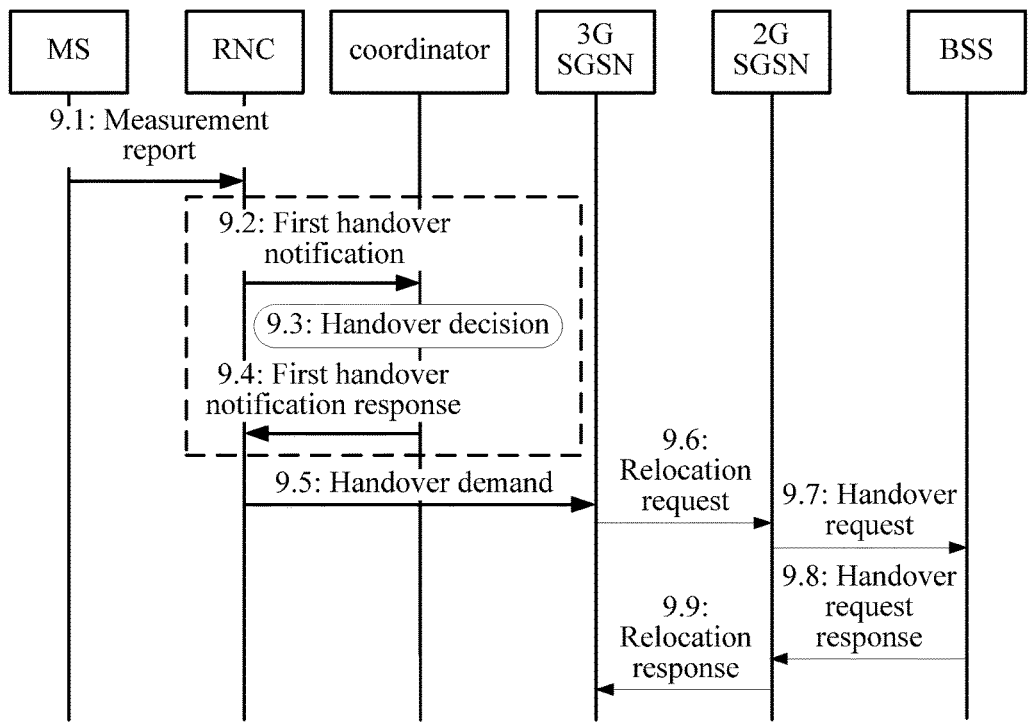
FIG. 9 is a schematic flow chart of a handover from UTRA to GERAN according to an embodiment of the present invention.

1) By taking a handover from LTE to UTRA (Universal Telecommunication Radio Access) as an example (referring to FIG. 4), the following steps can be performed.

Step 4.1. A UE reports a measurement report of a neighboring cell of a current serving cell obtained through measurement to a serving eNB of the serving cell.

Step 4.2. The serving eNB sends, to a coordinator, a first handover notification, where the first handover notification includes measurement results which are of a plurality of neighboring cells and are from the UE.

During a handover between different access networks, a measurement result may include a combination of different information of the following information: reference signal received power (Reference Signal Received Power, RSRP) and/or reference signal received quality (Reference Signal Received Quality, RSRQ), and UTRA FDD common pilot channel received signal code power (UTRA FDD CPICH RSCP), a UTRA FDD carrier received signal strength indicator (UTRA FDD carrier RSSI), a UTRA FDD common pilot channel energy per chip to noise spectral density ratio (UTRA FDD CPICH Ec/No), a GSM carrier received signal strength indicator (GSM carrier RSSI), a UTRA TDD carrier received signal strength indicator (UTRA TDD carrier RSSI), UTRA TDD primary common control physical channel received signal code power (UTRA TDD P-CCPCH RSCP), CDMA2000 1× radio transmission technology pilot strength (CDMA2000 1×RTT Pilot Strength) and CDMA2000 high rate packet data pilot strength (CDMA2000 HRPD Pilot Strength), and the like. For example, during a handover from LTE/UMTS/UTRA FDD/CDMA 2000 to UTRA TDD, a measurement result includes a UTRA TDD carrier RSSI and UTRA TDD P-CCPCH RSCP, and during a handover from LTE/UMTS/UTRA FDD/UTRA TDD to CDMA 2000, a measurement result includes pilot strength information and the like. These are distinguishable to a person skilled in the art, and are not described in detail here. Similarly, in the following embodiments in FIG. 4 to FIG. 9, information included in a measurement result is also listed exemplarily, and detailed classification and description are omitted.

Step 4.3. The coordinator determines signal quality of the plurality of neighboring cells according to the received measurement results, determines a load condition of at least one neighboring cell according to acquired information reflecting the load condition of the at least one neighboring cell among the plurality of neighboring cells, combines the foregoing information to make a handover decision for the UE, and decides a target cell of the handover.

Step 4.4. The coordinator sends, to the serving eNB, a first handover notification response, which includes an identifier (for example, a physical cell identifier (PCI, Physical Cell ID) of the target cell or a cell identifier (CI, Cell ID) of the target cell).

Common technologies may be adopted for subsequent steps (including step 4.5 to step 4.8), which are no longer described in detail here.

2) By taking a handover from UTRA to LTE as an example (referring to FIG. 5), the following steps can be performed.

Step 5.1. A UE reports a measurement report of a neighboring cell of a current serving cell obtained through measurement to a serving RNC of the serving cell.

Step 5.2. The serving RNC sends a first handover notification to a coordinator, where the first handover notification includes measurement results which are of a plurality of neighboring cells and are from the UE, and a measurement result may include: UTRA FDD CPICH RSCP, a UTRA FDD carrier RSSI, a UTRA FDD CPICH Ec/No, a UTRA TDD CPICH Ec/No, a GSM carrier RSSI, a UTRA TDD carrier RSSI, UTRA TDD P-CCPCH RSCP, CDMA2000 1×RTT Pilot Strength, and CDMA2000 HRPD Pilot Strength.

Step 5.3. The coordinator determines signal quality of the plurality of neighboring cells according to the received measurement results, determines a load condition of at least one neighboring cell according to acquired information reflecting the load condition of the at least one neighboring cell among the plurality of neighboring cells, combines the foregoing information to make a handover decision for the UE, and decides a target cell of the handover.

Step 5.4. The coordinator sends, to the serving RNC, a first handover notification response, which includes an identifier (for example, a PCI or CI) of the target cell.

Common technologies may be adopted for subsequent steps (including step 5.5 to step 5.7), which are no longer described in detail here.

3) By taking a handover from LTE to GERAN (GSM EDGE Radio Access Network) as an example (referring to FIG. 6), the following steps can be performed.

Step 6.1. A UE reports a measurement report of a neighboring cell of a current serving cell obtained through measurement to a serving eNB of the serving cell.

Step 6.2. The serving eNB sends a first handover notification to a coordinator, where the first handover notification includes measurement results which are of a plurality of neighboring cells and are from the UE, and a measurement result may include: RSRP and/or RSRQ, and UTRA FDD CPICH RSCP, a UTRA FDD carrier RSSI, a UTRA FDD CPICH Ec/No, a UTRA TDD CPICH Ec/No, and a GSM carrier RSSI.

Step 6.3. The coordinator determines signal quality of the plurality of neighboring cells according to the received measurement results, determines a load condition of at least one neighboring cell according to acquired information reflecting the load condition of the at least one neighboring cell among the plurality of neighboring cells, combines the foregoing information to make a handover decision for the UE, and decides a target cell of the handover.

Step 6.4. The coordinator sends, to the serving eNB, a first handover notification response, which includes an identifier (for example, a PCI or CI) of the target cell.

Common technologies may be adopted for subsequent steps (including step 6.5 to step 6.9), which are no longer described in detail here.

4) By taking a handover from GERAN to LTE as an example (referring to FIG. 7), the following steps can be performed.

Step 7.1. A UE reports a measurement report of a neighboring cell of a serving cell obtained through measurement to a serving BSS of the serving cell.

Step 7.2. The serving BSS sends a first handover notification to a coordinator, where the first handover notification includes measurement results which are of a plurality of neighboring cells and are from the UE, and a measurement result may include: RSRP and/or RSRQ, and a GSM carrier RSSI, UTRA FDD CPICH RSCP, a UTRA FDD carrier RSSI, a UTRA FDD CPICH Ec/No, and a UTRA TDD CPICH Ec/No.

Step 7.3. The coordinator determines signal quality of the plurality of neighboring cells according to the received measurement results, determines a load condition of at least one neighboring cell according to acquired information reflecting the load condition of the at least one neighboring cell among the plurality of neighboring cells, combines the foregoing information to make a handover decision for the UE, and decides a target cell of the handover.

Step 7.4. The coordinator sends, to the serving BSS, a first handover notification response, which includes an identifier (for example, a PCI or CI) of the target cell.

Common technologies may be adopted for subsequent steps (including step 7.5 to step 7.7), which are no longer described in detail here.

5) By taking a handover from GERAN to UTRA as an example (referring to FIG. 8), the following steps can be performed.

Step 8.1. An MS reports a measurement report of a neighboring cell of a serving cell obtained through measurement to a serving BSS of the serving cell.

Step 8.2. The serving BSS sends a first handover notification to a coordinator, where the first handover notification includes measurement results which are of a plurality of neighboring cells and are from the MS, and a measurement result includes: RSRP and/or RSRQ, and UTRA FDD CPICH RSCP, a UTRA FDD carrier RSSI, a UTRA FDD CPICH Ec/No, a GSM carrier RSSI, a UTRA TDD carrier RSSI, TRA TDD P-CCPCH RSCP, CDMA2000 1× RTT Pilot Strength, and CDMA2000 HRPD Pilot Strength.

Step 8.3. The coordinator determines signal quality of the plurality of neighboring cells according to the received measurement results, determines a load condition of at least one neighboring cell according to acquired information reflecting the load condition of the at least one neighboring cell among the plurality of neighboring cells, combines the foregoing information to make a handover decision for the MS, and decides a target cell of the handover.

Step 8.4. The coordinator sends, to the serving BSS, a first handover notification response, which includes an identifier (for example, a PCI or CI) of the target cell.

Common technologies may be adopted for subsequent steps (including step 8.5 to step 8.9), which are no longer described in detail here.

6) By taking a handover from UTRA to GERAN as an example (referring to FIG. 9), the following steps can be performed.

Step 9.1. An MS reports measurement results of neighboring cells of a serving cell obtained through measurement to a serving RNC of the serving cell.

Step 9.2. The serving RNC sends a first handover notification to a coordinator, where the first handover notification includes measurement results which are of a plurality of neighboring cells and are from the MS, and a measurement result may include RSRP and/or RSRQ, and UTRA FDD CPICH RSCP, a UTRA FDD carrier RSSI, a UTRA FDD CPICH Ec/No, a UTRA TDD CPICH Ec/No, and a GSM carrier RSSI.

Step 9.3. The coordinator determines signal quality of the plurality of neighboring cells according to the received measurement results, determines a load condition of at least one neighboring cell according to acquired information reflecting the load condition of the at least one neighboring cell among the plurality of neighboring cells, combines the foregoing information to make a handover decision for the MS, and decides a target cell of the handover.

Step 9.4. The coordinator sends, to the serving RNC, a first handover notification response, which includes an identifier (for example, a PCI or CI) of the target cell.

Common technologies may be adopted for subsequent steps (including step 9.5 to step 9.9), which are no longer described in detail here.

Figure 10:
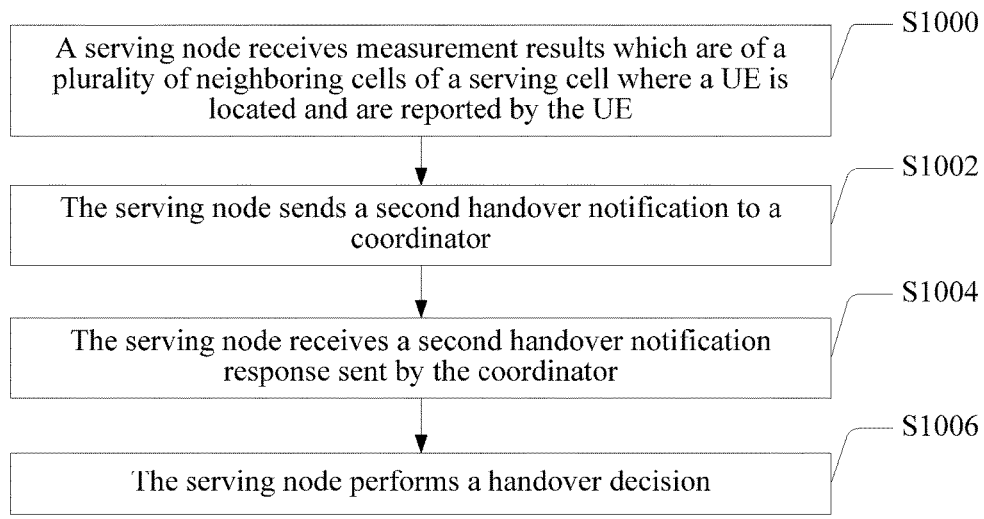
FIG. 10 is a schematic flow chart of an inter-RAT handover method according to an embodiment of the present invention.

In an embodiment of the present invention, a serving node may also be utilized to execute a handover decision. Referring to FIG. 10, FIG. 10 is a schematic flow chart of an inter-RAT handover method according to an embodiment of the present invention. The method includes:

S1000. A serving node receives measurement results which are of a plurality of neighboring cells of a serving cell where a UE is located and are reported by the UE.

S1002. The serving node sends a second handover notification to a coordinator.

S1004. The serving node receives a second handover notification response sent by the coordinator, where the second handover notification response includes information reflecting a load condition of at least one neighboring cell among the plurality of neighboring cells.

S1006. The serving node performs a handover decision; specifically, the serving node determines a target cell according to the measurement results of the plurality of neighboring cells and the information reflecting the load condition of the at least one neighboring cell among the plurality of neighboring cells.

In an implementation manner of this embodiment, a second handover notification is used for notifying the coordinator that one UE in the serving node needs to execute a handover, where the second handover notification includes an identifier, the identifier is used for notifying the coordinator to send, to a current serving cell, the information reflecting the load condition of the at least one neighboring cell among the plurality of neighboring cells. For example, the identifier may be represented by a flag, when the flag is 0, the coordinator does not need to send load condition relevant information of a neighboring cell to the current serving cell; and when the flag is 1, the coordinator sends, to the current serving cell, the information reflecting the load condition of the at least one neighboring cell. The second handover notification response may include load information and remaining resource information of the at least one neighboring cell, or include a target cell list generated according to load information and remaining resource information of the at least one neighboring cell.

The serving node may be an eNB, a Node B, an RNC or a BSS. In the following, several specific inter-RAT handover processes are combined to exemplarily describe the inter-RAT handover method of the embodiments of present invention.

In a handover process from LTE to UTRA, the following steps can be performed.

Step 1. A UE reports a measurement report of a neighboring cell of a current serving cell obtained through measurement to a serving eNB of the serving cell.

Step 2. The serving eNB sends a second handover notification to a coordinator, where the second handover notification is used for notifying the coordinator that one UE in the serving eNB needs to execute a handover and includes an identifier, and the identifier is used for notifying the coordinator to send, to the serving cell, information for reflecting a load condition of at least one neighboring cell among a plurality of neighboring cells.

Step 3. After receiving the second handover notification, the coordinator sends a second handover notification response to the serving eNB, where the second handover notification response may include load information and remaining resource information of the at least one neighboring cell, or include a target cell list recommended to a serving node by the coordinator according to load information and remaining resource information of the at least one neighboring cell.

Step 4. The serving eNB selects, according to the received measurement report, a target cell group A having better signal quality or signal strength, then selects, according to the load information and remaining resource information which are of the at least one neighboring cell and are fed back by the coordinator, a target cell group B having a lighter load (or determines a target cell group B according to the target cell list recommended by the coordinator), and acquires an intersection set of the two target cell groups to select a target cell of the handover.

Common technologies may be adopted for a subsequent step, which are no longer described in detail here.

In a handover process from UTRA to LTE, a serving RNC receives a measurement report reported by a UE and exchanges information with a coordinator. In a handover process from LTE to GERAN, a serving eNB receives a measurement report reported by a UE and exchanges information with a coordinator. In a handover process from GERAN to LTE, a serving BSS receives a measurement report reported by a UE and exchanges information with a coordinator. In a handover process from GERAN to UTRA, a serving BSS receives a measurement report reported by an MS and exchanges information with a coordinator. In a handover process from UTRA to GERAN, a serving RNC receives a measurement report reported by an MS and exchanges information with a coordinator. For specific information exchange processes in the foregoing several inter-RAT handovers and handover decision processing of each serving node, reference may be made to the foregoing handover process from LTE to UTRA, which are no longer described in detail here.

In the inter-RAT handover method of the embodiments of present invention, a coordinator or a serving node is utilized to perform a handover decision, so as to combine signal quality of a plurality of neighboring cells of a current serving cell and a load condition of at least one neighboring cell among the plurality of neighboring cells to perform a handover, thereby increasing an inter-RAT handover success rate.

Figure 11A:
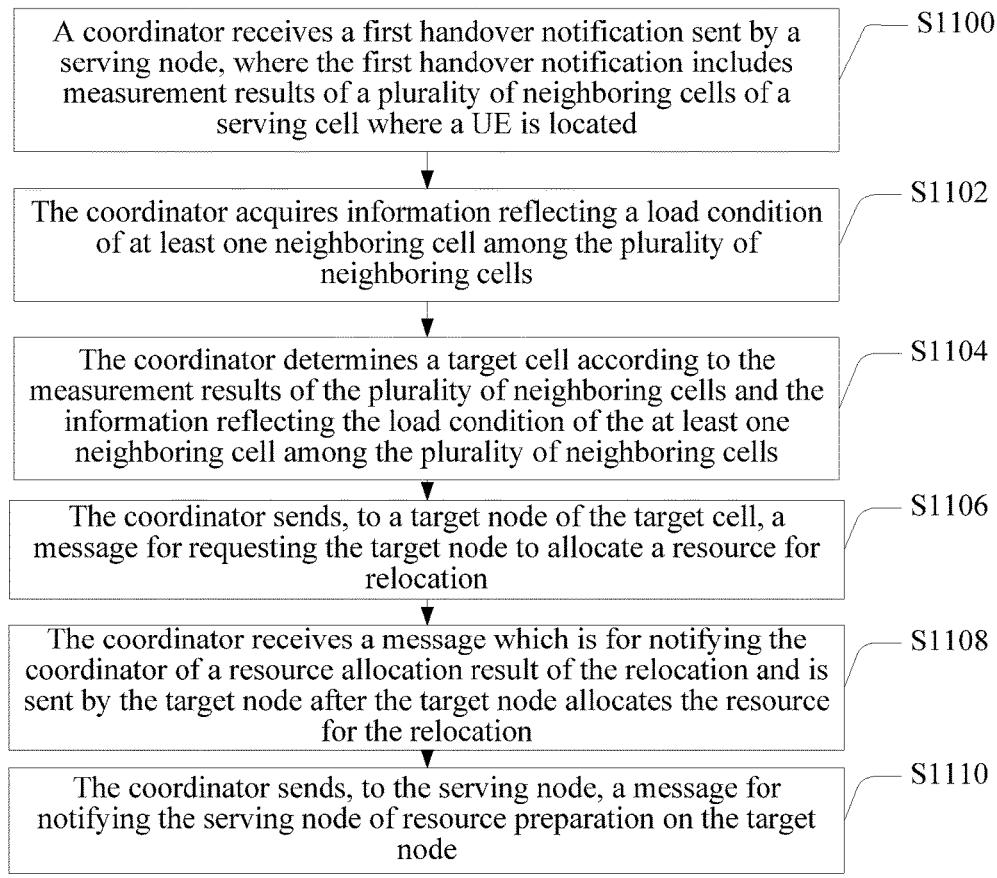
FIG. 11A is a schematic flow chart of an inter-RAT handover method according to an embodiment of the present invention.

Referring to FIG. 11A, FIG. 11A is a schematic flow chart of an inter-RAT handover method according to an embodiment of the present invention. The method includes the following steps.

S1100. A coordinator receives a first handover notification sent by a serving node, where the first handover notification includes measurement results of a plurality of neighboring cells of a serving cell where a UE is located.

S1102. The coordinator acquires information reflecting a load condition of at least one neighboring cell among the plurality of neighboring cells.

S1104: The coordinator determines a target cell according to the measurement results of the plurality of neighboring cells and the information reflecting the load condition of the at least one neighboring cell among the plurality of neighboring cells.

S1106: The coordinator sends, to a target node of the target cell, a message for requesting the target node to allocate a resource for redirection.

S1108. The coordinator receives a message which is for notifying the coordinator of a resource allocation result of the redirection and is sent by the target node after the target node allocates the resource for the redirection.

S1110: The coordinator sends, to the serving node, a message for notifying the serving node of resource preparation on the target node.

For description of steps S1100, S1102, and S1104, reference may be made to the description of corresponding steps in the embodiments in FIG. 2, FIG. 3, and FIG. 4 to FIG. 9, and details are no longer described in detail here.

Figure 11B:
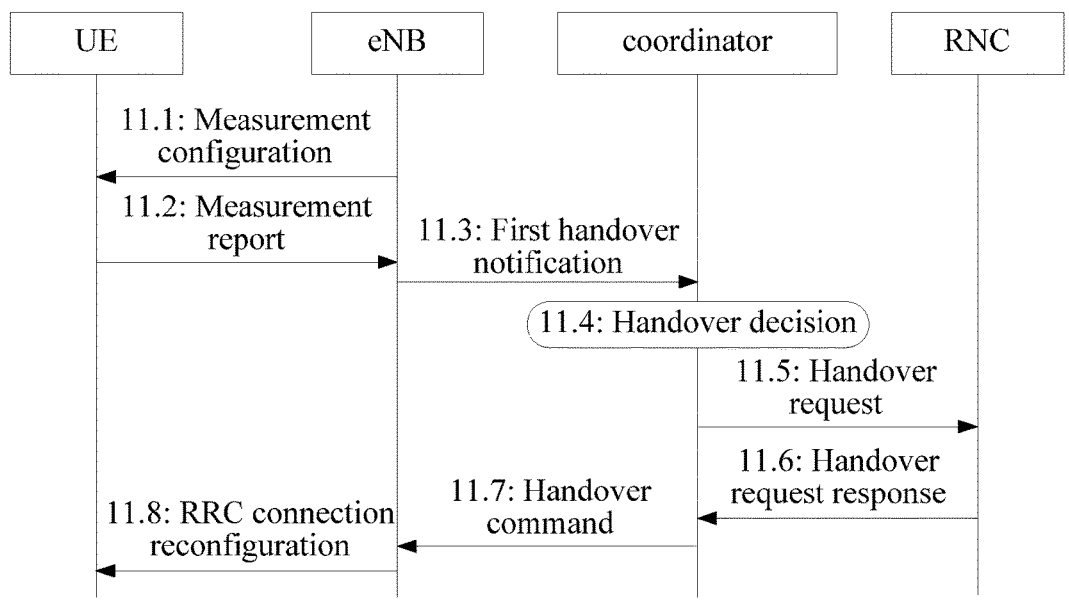
FIG. 11B is a schematic flow chart of an inter-RAT handover in which an eNB serves as a serving node.

The serving node in this embodiment includes: an eNB, a Node B, an RNC or a BSS. In an implementation manner of this embodiment, referring to FIG. 11B, FIG. 11B is a schematic flow chart of an inter-RAT handover in which an eNB serves as a serving node. This implementation manner implements a handover from LTE to UTRA, where a target node is an RNC. Specifically, the following steps can be performed.

Step 11.1. A serving cell configures a measurement configuration for a UE.

Step 11.2. A UE reports a measurement report of a neighboring cell obtained through measurement to a serving eNB of the serving cell. (The prior art may be adopted for step 11.1 and step 11.2).

Step 11.3. The serving eNB sends a first handover notification to a coordinator, where the first handover notification includes measurement results of a plurality of neighboring cells of the serving cell where the UE is located.

Step 11.4. The coordinator executes a handover decision to determine a target RNC, and for a specific step, reference may be made to step S1102 and step S1104 in FIG. 11A.

Step 11.5. The coordinator sends, to the target RNC, a handover request for requesting the target RNC to allocate a resource for redirection, where the message includes, but is not limited to, the following information: a UE identifier (UE Identifier), a cause (Cause), a core network domain indicator (CN Domain Indicator), integrity protection information (Integrity protection information), encryption information (Encryption information), a radio access bearer to be setup list (RAB to be setup list), CSG relevant information, and source RNC to target RNC transparent container (Source RNC to Target RNC Transparent Container).

Step 11.6. After allocating the resource for the redirection, the target RNC sends, to the coordinator, a handover request response for notifying the coordinator of a resource allocation result of the redirection, where the message may include, but is not limited to, the following information: a target RNC to source RNC transparent container (Target RNC to Source RNC Transparent Container), a radio access bearers setup list (RABs setup list), and a radio access bearers failed to setup list (RABs failed to setup list).

Step 11.7. The coordinator sends, to the serving eNB, a handover command for notifying the serving node of resource preparation on the target RNC, where the message may include, but is not limited to, the following information: a target to source transparent container (Target to Source Transparent Container), an E-radio access bearers to release list (E-RABs to Release List), and a data forwarding list.

The prior art may be adopted for a subsequent step (including 11.8), and details are not described in detail here.

In other implementation manners of this embodiment, a coordinator executes a handover decision to determine a target node, and then sends, to the target node, a handover request to request the target node to allocate a resource for redirection. After allocating the resource for the redirection, the target node sends, to the coordinator, a handover request response to notify the coordinator of a resource allocation result of the redirection. The coordinator sends a handover command to the serving node to notify the serving node of resource preparation on the target node.

1) During a handover from LTE to GERAN/CDMA 2000, a handover request may include, but is not limited to, the following information: a cause, a target cell identifier (Target Cell Identifier), a packet flow contexts to be set-up list (PFCs to be set-up list, packet flow context (Packet Flow Context, PFC)), a source RNC to target BSS transparent container (Source RNC to Target BSS Transparent Container), and a non-access stratum container for handover (NAS container for handover); a handover request response may include, but is not limited to, the following information: a Target to Source Transparent Container, an S1AP protocol cause (S1AP Cause), an evolved packet system bearers setup list (EPS (Evolved Packet System) Bearers setup list), and an evolved packet system bearers failed to setup list (EPS Bearers failed to setup list); a handover command may include, but is not limited to, the following information: a Target to Source Transparent Container, an E-RABs to Release List, and a data forwarding list.

2) During a handover from UTRA to LTE, a handover request may include, but is not limited to, the following information: a UE Identifier, an S1AP Cause, an encryption relevant parameter and algorithm, a non-access stratum security parameter to E-UTRAN(NAS Security Parameters to E-UTRAN), an evolved network system bearers to be setup list (EPS Bearers to be setup list), CSG relevant information, and a source to target transparent container (Source to Target Transparent Container); a handover request response may include, but is not limited to, the following information: a Target to Source Transparent Container, an EPS Bearers setup list, and an EPS Bearers failed to setup list; a handover command may include, but is not limited to, the following information: a target RNC to source RNC transparent container (Target RNC to Source RNC Transparent Container), a RABs to be Released List, and a data forwarding list.

3) During a handover from GERAN/CDMA 2000 to LTE, a handover request may include, but is not limited to, the following information: a UE Identifier, an S1AP Cause, an integrity protection relevant parameter and algorithm, an encryption relevant parameter and algorithm, a bearers to be setup list (Bearers to be setup list), a Source to Target Transparent Container, and a handover restriction list (Handover Restriction List); a handover request response may include, but is not limited to, the following information: a Target to Source Transparent Container, an S1AP Cause, an EPS Bearers setup list, and an EPS Bearers failed to setup list; a handover command may include, but is not limited to, the following information: a temporary logical link identity (Temporary Logical Link Identity, TLLI), a list of set up packet flow contexts (List of Set Up PFCs), a target RNC to source BSS transparent container (Target RNC to Source BSS Transparent Container), and a Cause.

4) During a handover from UTRA to GERAN/CDMA 2000, a handover request may include, but is not limited to, the following information: a Cause, a Target Cell Identifier, a source BSS to target BSS transparent container (Source BSS to Target BSS Transparent Container), and a NAS container for handover; a handover request response may include, but is not limited to, the following information: a target BSS to source BSS transparent container (Target BSS to Source BSS Transparent Container); a handover command may include, but is not limited to, the following information: a Target BSS to Source BSS Transparent Container, a RABs to be Released List, and a data forwarding list.

5) During a handover from GERAN/CDMA 2000 to UTRA, a handover request may include, but is not limited to, the following information: a permanent non-access stratum identity (Permanent NAS Identity), a Cause, a CN Domain Indicator, Integrity protection information, encryption information (Encryption information), a RABs To Be Set Up List, a Source to Target Transparent Container and an Iu signaling connection identifier (Iu Signaling connection identifier); a handover request response may include, but is not limited to, the following information: a Source to Target Transparent Container, a RABs setup list, and a RABs failed to setup list; a handover command may include, but is not limited to, the following information: a TLLI, a List of Set Up PFCs, and a Source to Target Transparent Container.

Figure 12A:
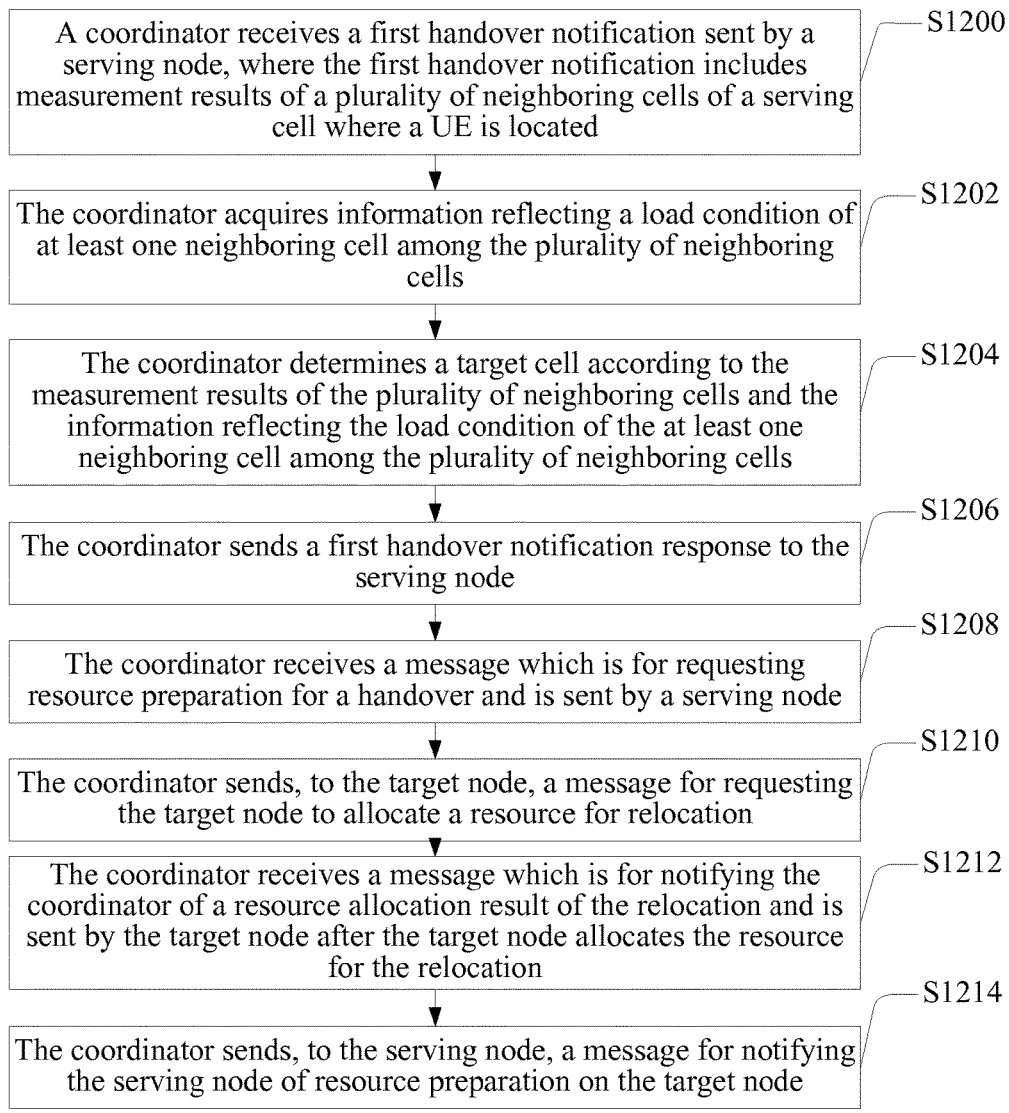
FIG. 12A is a schematic flow chart of an inter-RAT handover method according to an embodiment of the present invention.

Referring to FIG. 12A, FIG. 12A is a schematic flow chart of an inter-RAT handover method according to an embodiment of the present invention. The method includes:

S1200. A coordinator receives a first handover notification sent by a serving node, where the first handover notification includes measurement results of a plurality of neighboring cells of a serving cell where a UE is located.

S1202. The coordinator acquires information reflecting a load condition of at least one neighboring cell among the plurality of neighboring cells.

S1204. The coordinator determines a target cell according to the measurement results of the plurality of neighboring cells and the information reflecting the load condition of the at least one neighboring cell among the plurality of neighboring cells.

S1206. The coordinator sends a first handover notification response to the serving node, where the first handover notification response includes an identifier of the target cell.

S1208. The coordinator receives a message which is for requesting resource preparation for a handover and is sent by the serving node.

S1210. The coordinator sends, to a target node, a message for requesting the target node to allocate a resource for redirection.

S1212. The coordinator receives a message which is for notifying the coordinator of a resource allocation result of the redirection and is sent by the target node after the target node allocates the resource for the redirection.

S1214. The coordinator sends, to the serving node, a message for notifying the serving node of the resource preparation on the target node.

The serving node in this embodiment includes: an eNB, a Node B, an RNC or a BSS.

For description of steps S1200 to S1206, reference may be made to the corresponding description of the embodiments in FIG. 2 and FIG. 10, and details are no longer described in detail here. For description of step S1208 to step S1214, reference may be made to corresponding description of six implementation manners listed exemplarily in the following.

Figure 12B:
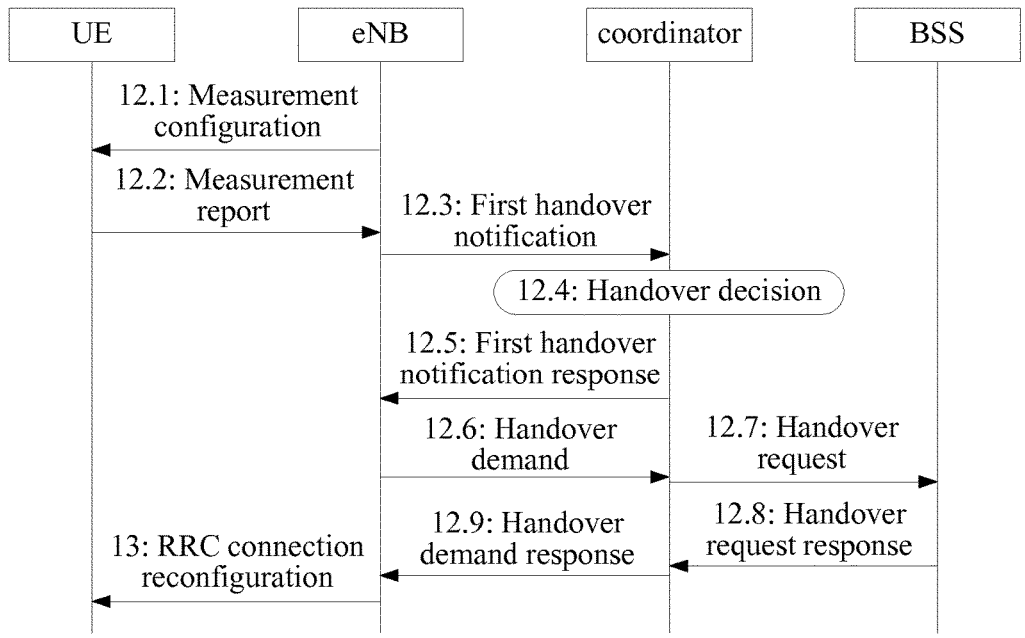
FIG. 12B is a schematic flow chart of an inter-RAT handover in which an eNB serves as a serving node.

In an implementation manner of this embodiment, referring to FIG. 12B, FIG. 12B is a schematic flow chart of a handover in which an eNB serves as a serving node. This implementation manner implements a handover from LTE to GERAN/CDMA 2000, where a target node is a BSS. Specifically:

For step 12.1 and step 12.2, reference may be made to the corresponding description in FIG. 11B.

For step 12.3, step 12.4, and step 12.5, reference may be made to step 1200 to step 1206 in FIG. 12A.

Step 12.6. The serving eNB sends, to the coordinator, a handover demand message for request resource preparation for a handover, where the message may include, but is not limited to, the following information: an S1AP Cause, a target system identifier (Target System Identifier), and a Source to Target Transparent Container.

Step 12.7. The coordinator sends, to the target BSS, a handover request for requesting the target BSS to allocate a resource for redirection, where the message includes, but is not limited to, the following information: a Cause, a Target Cell Identifier, an PFCs to be set-up list, a Source RNC to Target BSS Transparent Container, and a NAS container for handover.

Step 12.8. The target BSS allocates the resource for the redirection to make the resource preparation for the redirection, and sends, to the coordinator, a handover request response for notifying the coordinator of a resource allocation result of the redirection, where the message may include, but is not limited to, the following information: a Target to Source Transparent Container, an S1AP Cause, an EPS Bearers setup list, and an EPS Bearers failed to setup list.

Step 12.9. The coordinator sends, to the serving eNB, a handover demand response for notifying the serving node of the resource preparation on the target BSS, where the message may include, but is not limited to, the following information: a Target to Source Transparent Container, an E-RABs to Release List, and a data forwarding list.

The prior art may be adopted for a subsequent step (including step 13), and details are not described in detail here.

Other implementation manners in this embodiment will be described in the examples below.

1) During a handover from LTE to UTRA, a serving eNB sends, to a coordinator, a handover request for requesting resource preparation for the handover, where the message may include, but is not limited to, the following information: a Cause, a target RNC identifier (Target RNC Identifier), a closed subscriber group identifier (CSG ID), a CSG access mode (CSG access mode), and a Source to Target Transparent Container. The coordinator sends, to a target RNC, a redirection request for request the target RNC to allocate a resource for redirection, where the message may include, but is not limited to, the following information: a UE Identifier, a Cause, a CN Domain Indicator, Integrity protection information, Encryption information, a RAB to be setup list, CSG relevant information, and a Source RNC to Target RNC Transparent Container. After allocating the resource for the redirection, the target RNC sends, to the coordinator, a redirection request response for notifying the coordinator of a resource allocation result of the redirection, where the message may include, but is not limited to, the following information: a Target RNC to Source RNC Transparent Container, a RABs setup list, and a RABs failed to setup list. The coordinator sends, to the serving eNB, a handover request response for notifying the serving eNB of the resource preparation on the target RNC, where the message may include, but is not limited to: a Target to Source Transparent Container, an E-RABs to Release List, and a data forwarding list.

2) During a handover from UTRA to LTE, a serving RNC sends, to a coordinator, a redirection demand for requesting resource preparation for the handover, where the message may include, but is not limited to, the following information: a Cause, a target eNB identifier (Target eNB Identifier), CSG relevant information, a source RNC identifier (Source RNC Identifier), and a Source RNC to Target RNC Transparent Container. The coordinator sends, to a target eNB, a handover request for requesting the target eNB to allocate a resource for redirection, where the message includes, but is not limited to, the following information: a UE Identifier, an S1AP Cause, an encryption relevant parameter and algorithm, NAS Security Parameters to E-UTRAN, an EPS Bearers to be setup list, CSG relevant information, and a Source to Target Transparent Container. After allocating the resource for the redirection, the target eNB sends, to the coordinator, a handover request response for notifying the coordinator of a resource allocation result of the redirection, where the message may include, but is not limited to, the following information: a Target to Source Transparent Container, an EPS Bearers setup list, and an EPS Bearers failed to setup list. The coordinator sends, to the serving RNC, a redirection demand response for notifying the serving RNC of the resource preparation on the target eNB, where the message may include, but is not limited to, the following information: a Target RNC to Source RNC Transparent Container, a RABs to be Released List, and a data forwarding list.

3) During a handover from GERAN/CDMA 2000 to LTE, a serving BSS sends, to a coordinator, a handover demand for requesting resource preparation for the handover, where the message may include, but is not limited to: a Cause, a source cell identifier (Source Cell Identifier), a Target eNB Identifier, and a source BSS to target RNC transparent container (Source BSS to Target RNC Transparent Container). The coordinator sends, to the target eNB, a handover request for requesting the target eNB to allocate a resource for redirection, where the message may include, but is not limited to, the following information: a UE Identifier, an S1AP Cause, an integrity protection relevant parameter and algorithm, an encryption relevant parameter and algorithm, a Bearers to be setup list, a Source to Target Transparent Container, and a Handover Restriction List. After allocating the resource for the redirection, the target eNB sends, to the coordinator, a handover request response for notifying the coordinator of a resource allocation result of the redirection, where the message may include, but is not limited to, the following information: a Target to Source Transparent Container, an S1AP Cause, an EPS Bearers setup list, and an EPS Bearers failed to setup list. The coordinator sends, to the serving BSS, a handover demand response for notifying the serving BSS of the resource preparation on the target eNB, where the message may include, but is not limited to, the following information: a TLLI, a List of Set Up PFCs, a Target RNC to Source BSS Transparent Container, and a Cause.

4) During a handover from UTRA to GERAN/CDMA 2000, a serving RNC sends, to a coordinator, a redirection demand for requesting resource preparation for the handover, where the message may include, but is not limited to, the following information: a redirection type (Redirection Type), a Cause, a source identifier (Source ID), a target identifier (Target ID), and a Source BSS To Target BSS Transparent Container. The coordinator sends, to a target BSS, a handover request for requesting the target BSS to allocate a resource for redirection, where the message may include, but is not limited to, the following information: a Cause, a Target Cell Identifier, a Source BSS to Target BSS Transparent Container, and a NAS container for handover. After allocating the resource for the redirection, the target BSS sends, to the coordinator, a handover request response for notifying the coordinator of a resource allocation result of the redirection, where the message may include, but is not limited to, the following information: a Target BSS to Source BSS Transparent Container. The coordinator sends, to the serving RNC, a redirection demand response for notifying the serving RNC of the resource preparation on the target BSS, where the message may include, but is not limited to, the following information: a Target BSS to Source BSS Transparent Container, a RABs to be Released List, and a data forwarding list.

5) During a handover from GERAN/CDMA 2000 to UTRA, a serving BSS sends, to a coordinator, a handover demand for requesting resource preparation for the handover, where the message may include, but is not limited to, the following information: a TLLI, a Cause, a source cell identifier (Source Cell Identifier), a target RNC identifier (Target RNC Identifier), a Source to Target Transparent Container, and an active packet stream contexts list (Active PFCs List). The coordinator sends, to a target RNC, a redirection request for requesting the target RNC to allocate a resource for redirection, where the message may include, but is not limited to, the following information: a Permanent NAS Identity, a Cause, a CN Domain Indicator, Integrity protection information, Encryption information, a RABs To Be Set Up List, a Source to Target Transparent Container, and an Iu Signaling connection identifier. After allocating the resource for the redirection, the target RNC sends, to the coordinator, a redirection request response for notifying the coordinator of a resource allocation result of the redirection, where the message may include, but is not limited to, the following information: a Source to Target Transparent Container, a RABs setup list, and a RABs failed to setup list. The coordinator sends, to the serving BSS, a handover demand response for notifying the serving BSS of the resource preparation on the target RNC, where the message may include, but is not limited to, the following information: a TLLI, a List of Set Up PFCs, and a Source to Target Transparent Container.

Figure 13:
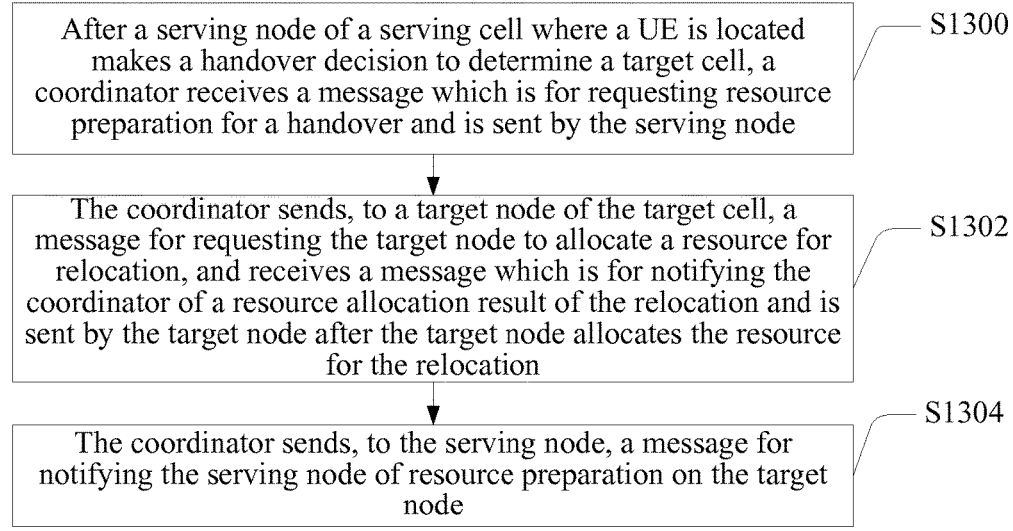
FIG. 13 is a schematic flow chart of an inter-RAT handover method according to an embodiment of the present invention.

Referring to FIG. 13, FIG. 13 is a schematic flow chart of an inter-RAT handover method according to an embodiment of the present invention. The method includes the following steps.

S1300. After a serving node of a serving cell where a UE is located makes a handover decision to determine a target cell, a coordinator receives a message which is for requesting resource preparation for a handover and is sent by the serving node.

S1302. The coordinator sends, to a target node of the target cell, a message for requesting the target node to allocate a resource for redirection, and receives a message which is for notifying the coordinator of a resource allocation result of the redirection and is sent by the target node after the target node allocates the resource for the redirection.

S1304. The coordinator sends, to the serving node, a message for notifying the serving node of the resource preparation on the target node.

In a first implementation manner of this embodiment, that a serving node of a serving cell where a UE is located makes a handover decision to determine a target cell may include: The serving node may determine signal quality of a plurality of neighboring cells according to measurement results of the plurality of neighboring cells reported by the UE, and select a neighboring cell having best signal quality among the plurality of neighboring cells as the target cell.

In a second implementation manner of this embodiment, that a serving node of a serving cell where a UE is located makes a handover decision to determine a target cell may adopt the solution in the embodiment of FIG. 10.

In this embodiment, for description of step S1300 to step S1304, reference may be made to the description of step S1208 to step S1214 in the embodiment in FIG. 12A, and details are no longer described in detail here.

In the inter-RAT handover method of the embodiments of present invention, a coordinator, a serving node, and a target node are utilized for communication, so that a core network is not required in a handover process, thereby shortening a handover delay and increasing a handover success rate.

Figure 14:
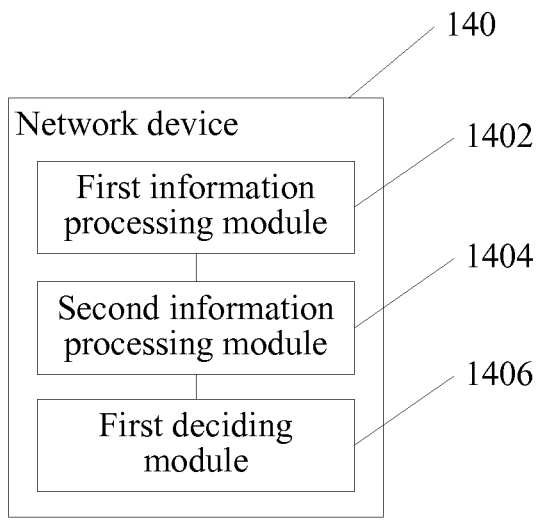
FIG. 14 is a schematic structural diagram of a network device according to an embodiment of the present invention.

Referring to FIG. 14, FIG. 14 is a schematic structural diagram of a network device according to an embodiment of the present invention. The network device 140 includes a number of modules.

A first information processing module 1402 is configured to acquire measurement results of a plurality of neighboring cells of a serving cell where a UE is located.

A second information processing module 1404 is configured to acquire information reflecting a load condition of at least one neighboring cell among the plurality of neighboring cells.

A first deciding module 1406 is configured to perform a handover decision according to the measurement results of the plurality of neighboring cells and the information reflecting the load condition of the at least one neighboring cell among the plurality of neighboring cells.

The information reflecting the load condition of the at least one neighboring cell among the plurality of neighboring cells includes: load information and remaining resource information of the at least one neighboring cell, or includes a target cell list generated according to load information and remaining resource information of the at least one neighboring cell.

The network device 140 of the embodiments of present invention may be a coordinator or a serving node, and the serving node includes: an eNB, a Node B, an RNC or a BSS.

In an implementation manner of this embodiment, the first deciding module 1406 of the network device 140 (including a coordinator or a serving node) may determine signal quality (including: signal strength) of the plurality of neighboring cells according to the measurement results of the plurality of neighboring cells, and perform the handover decision in the following manners:

1) Select at least one neighboring cell whose signal quality reaches one first threshold and load condition reaches one second threshold at the same time, and then randomly select one as a target cell; or 2) Determine a set of neighboring cells whose load conditions reach one threshold, and then select a neighboring cell having best signal quality as a target cell; or 3) Determine a set A of neighboring cells whose signal quality reaches one first threshold, determine a set B of neighboring cells (for example, a target cell list) whose load conditions reach one second threshold, then acquire an intersection set of the set A and the set B, and make a selection according to an intersection set result.

Figure 15A:
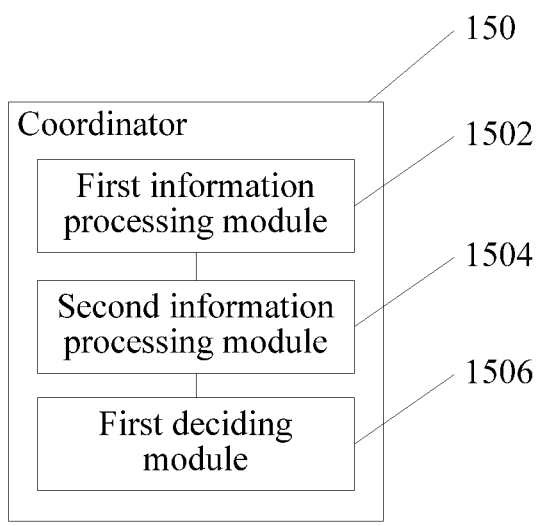
FIG. 15A is a schematic structural diagram of a coordinator according to an embodiment of the present invention.

Referring to FIG. 15A, FIG. 15A is a schematic structural diagram of a coordinator according to an embodiment of the present invention. The coordinator 150 includes:

A first information processing module 1502 is configured to receive a first handover notification sent by a serving node of a serving cell where a UE is located, where the first handover notification includes measurement results of a plurality of neighboring cells of the serving cell where the UE is located.

A second information processing module 1504 is configured to acquire information reflecting a load condition of at least one neighboring cell among the plurality of neighboring cells.

A first deciding module 1506 is configured to determine a target cell according to the measurement results of the plurality of neighboring cells and the information reflecting the load condition of the at least one neighboring cell among the plurality of neighboring cells.

The serving node includes an eNB, a Node B, an RNC or a BSS. The coordinator 150 in this embodiment may be configured to execute the steps executed by the coordinator in the embodiment of FIG. 3.

In an implementation manner of this embodiment, the second information processing module 1504 periodically acquires load information and remaining resource information of at least one neighboring cell among the plurality of neighboring cells (for example, the at least one neighboring cell periodically reports its load condition to the coordinator) and stores the load information and remaining resource information (the storage may be selective, for example, the coordinator may only store load condition relevant information of a neighboring cell whose load condition reaches one threshold). The coordinator may also acquire, from at least one neighboring cell of the plurality of neighboring cells, load information and remaining resource information of the at least one neighboring cell after receiving a trigger message (for example, a second handover notification) sent by the serving node. The coordinator may also generate a target cell list according to the acquired load information and remaining resource information of the at least one neighboring cell (for example, the coordinator selects a neighboring cell whose load condition reaches one threshold to form a target cell list).

For description of the first deciding module 1506, reference may be made to the description of the first deciding module 1406 in the embodiment of FIG. 14, and details are no longer described in detail here.

Figure 15B:
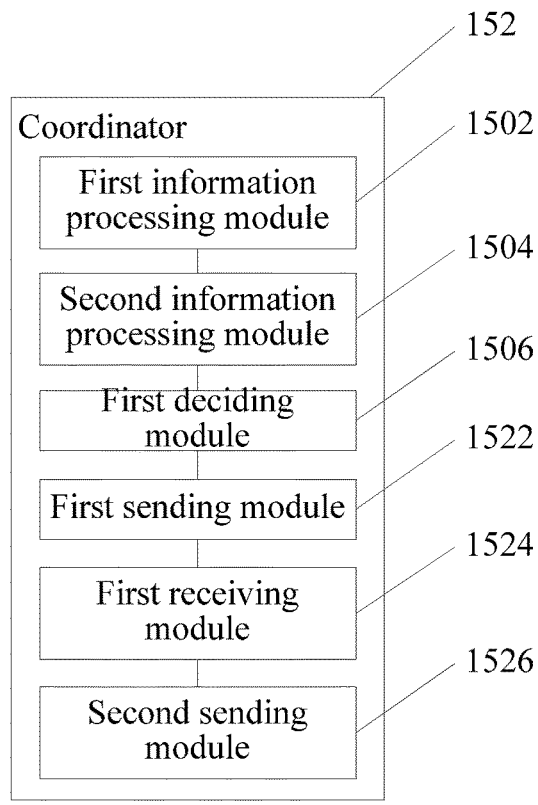
FIG. 15B is a schematic structural diagram of a coordinator according to an embodiment of the present invention.

In another embodiment of a coordinator of the embodiments of present invention, referring to FIG. 15B, the coordinator 152 includes all modules and functions of the coordinator 150, and meanwhile, further includes the following modules.

A first sending module 1522 is configured to send, to a target node of a target cell, a message for requesting the target node to allocate a resource for redirection, for example, a handover request.

A first receiving module 1524 is configured to receive a message which is for notifying a coordinator of a resource allocation result of the redirection and is sent by the target node after the target node allocates the resource for the redirection, for example, a handover request response.

A second sending module 1526 is configured to send, to a serving node, a message for notifying the serving node of resource preparation on the target node, for example, a handover command.

The coordinator 152 in this embodiment may be configured to execute the steps executed by the coordinator in the embodiment of FIG. 11A. The target node includes an eNB, a Node B, an RNC or a BSS. For description of the messages, reference may be made to the corresponding description of the embodiment in FIG. 11A, and details are no longer described in detail here.

Figure 16A:
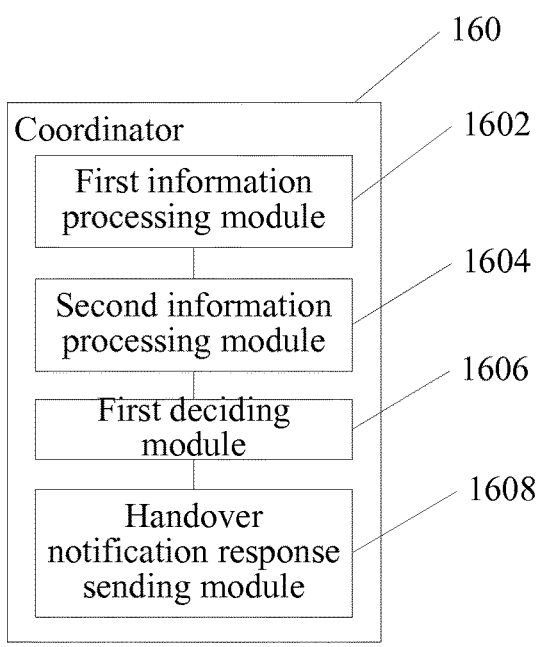
FIG. 16A is a schematic structural diagram of a coordinator according to an embodiment of the present invention.

Referring to FIG. 16A, FIG. 16A is a schematic structural diagram of a coordinator according to an embodiment of the present invention. The coordinator 160 includes: a first information processing module 1602, a second information processing module 1604, a first deciding module 1606, and a handover notification response sending module 1608. For description of the first information processing module 1602, the second information processing module 1604, and the first deciding module 1606, reference may be made to the description of the corresponding modules of the coordinator 150 of the embodiment in FIG. 15A. The handover notification response sending module 1608 is configured to send, to a serving node, a first handover notification response, where the first handover notification response includes an identifier (for example, a PCI or CI) of a target cell.

The coordinator 160 in this embodiment may be configured to execute the steps executed by the coordinator in the embodiments of FIG. 4 to FIG. 9.

Figure 16B:
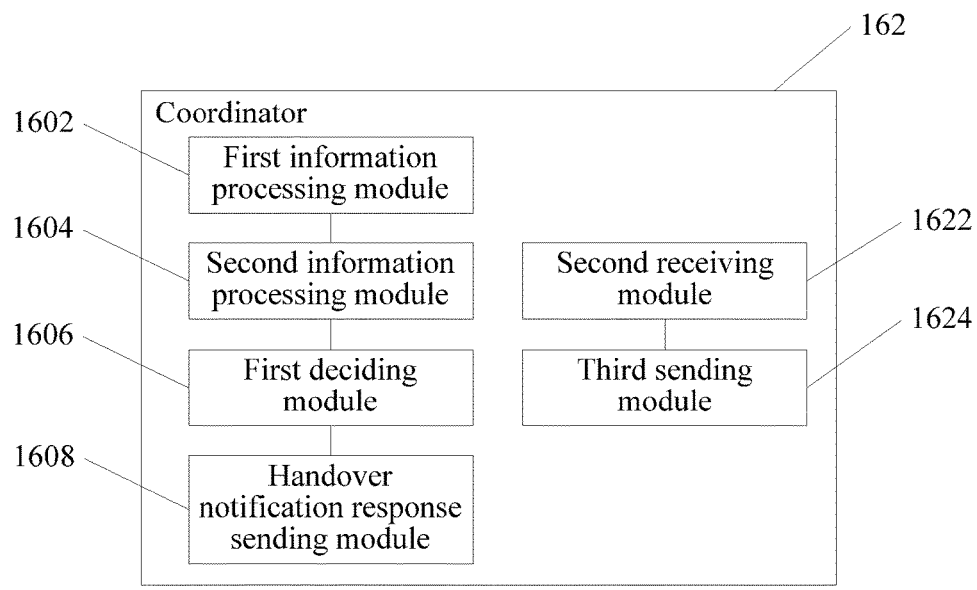
FIG. 16B is a schematic structural diagram of a coordinator according to an embodiment of the present invention.

In another embodiment of a coordinator of the present invention, referring to FIG. 16B, the coordinator 162 includes all modules and functions of the coordinator 160, and meanwhile, further includes the following modules.

A second receiving module 1622 is configured to receive a message which is for requesting resource preparation for a handover and is sent by a serving node, and receive a message which is for notifying the coordinator of a resource allocation result of redirection and is sent by a target node of a target cell after the target node allocates a resource for the redirection.

The third sending module 1624 is configured to send, to the target node, a message for requesting the target node to allocate the resource for the redirection, and send, to the serving node, a message for notifying the serving node of the resource preparation on the target node.

The coordinator 160 in this embodiment may be configured to execute the steps executed by the coordinator in the embodiment of FIG. 12A. The target node includes an eNB, a Node B, an RNC or a BSS. The serving node includes an eNB, a Node B, an RNC or a BSS.

Figure 17A:
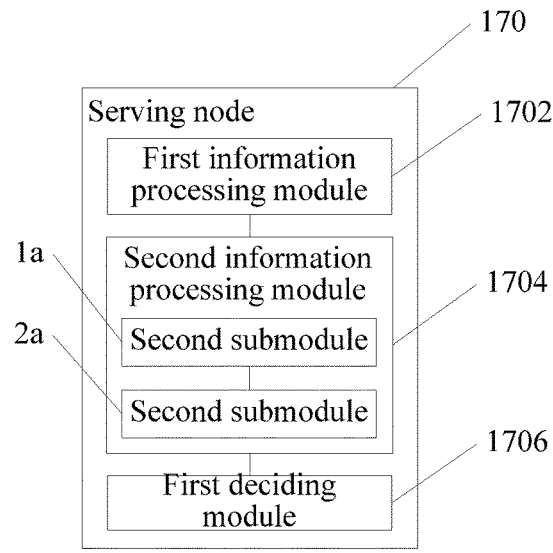
FIG. 17A is a schematic structural diagram of a serving node according to an embodiment of the present invention.

Referring to FIG. 17A, FIG. 17A is a schematic structural diagram of a serving node according to one embodiment of the present invention. The serving node 170 includes the following modules.

A first information processing module 1702 is configured to receive measurement results which are of a plurality of neighboring cells of a serving cell where a UE is located and are reported by the UE.

A second information processing module 1704 is configured to send, to a coordinator, a second handover notification and receive a second handover notification response sent by the coordinator, where the second handover notification response includes information reflecting a load condition of at least one neighboring cell among the plurality of neighboring cells.

A first deciding module 1706 is configured to determine a target cell according to the measurement results of the plurality of neighboring cells and the information reflecting the load condition of the at least one neighboring cell among the plurality of neighboring cells.

The second information processing module 1704 may include a first submodule 1a and a second submodule 2a. The first submodule 1a is configured to send, to the coordinator, the second handover notification. The second submodule 2a is configured to receive the second handover notification response sent by the coordinator, where the second handover notification response includes the information reflecting the load condition of the at least one neighboring cell among the plurality of neighboring cells.

The serving node 170 may be an eNB, a Node B, an RNC or a BSS. The second handover notification includes an identifier, and the identifier is used for notifying the coordinator to send, to the serving node, the information reflecting the load condition of the at least one neighboring cell. For example, the identifier may be represented by a flag; when the flag is 0, the coordinator does not need to send, to a current serving cell, the information reflecting the load condition of the at least one neighboring cell; when the flag is 1, the coordinator sends, to the current serving cell, the information reflecting the load condition of the at least one neighboring cell. The second handover notification response may include load information and remaining resource information of the at least one neighboring cell, or a target cell list generated according to load information and remaining resource information of the at least one neighboring cell.

The serving node 170 in this embodiment may be configured to execute the steps executed by the serving node in the embodiment of FIG. 10.

Figure 17B:
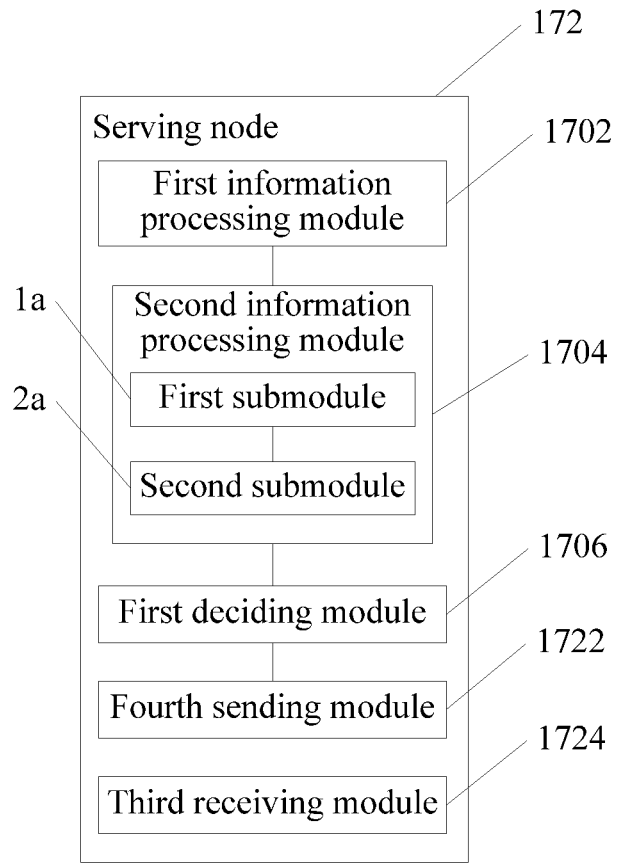
FIG. 17B is a schematic structural diagram of a serving node according to an embodiment of the present invention.

In another embodiment of the present invention, referring to FIG. 17B, the serving node 172 includes all modules and functions of the serving node 170, and meanwhile, further includes the following modules.

A fourth sending module 1722 is configured to send, to a coordinator, a message for requesting resource preparation for a handover, so that the coordinator requests a target node of a target cell to allocate a resource for redirection.

A third receiving module 1724 is configured to, after the target node notifies the coordinator of a resource allocation result of the redirection, receive a message which is for notifying the serving node of the resource preparation on the target node and is sent by the coordinator redirection.

The serving node 172 in this embodiment may be configured to execute the steps executed by the serving node in the embodiment of FIG. 12A.

The coordinator and serving node provided in the embodiments of present invention may perform a handover decision according to signal quality and load condition relevant information of a neighboring cell, thereby increasing a handover success rate.

Figure 18:
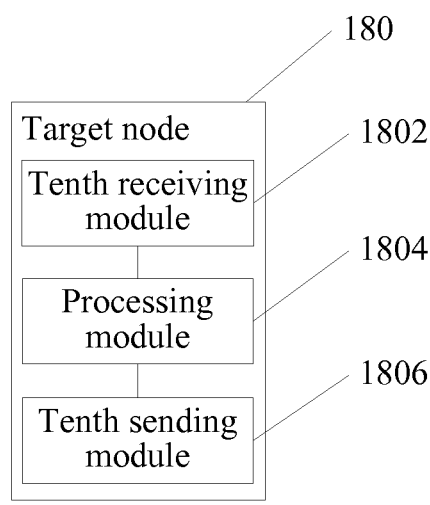
FIG. 18 is a schematic structural diagram of a target node according to an embodiment of the present invention.

Referring to FIG. 18, FIG. 18 is a schematic structural diagram of a target node according to an embodiment of the present invention. The target node 180 includes: a tenth receiving module 1802, a processing module 1804, and a tenth sending module 1806. The tenth receiving module 1802 is configured to receive a message which is for requesting the target node to allocate a resource for redirection and is sent by a coordinator. The processing module 1804 is configured to, redirection after the tenth receiving module 1802 receives the message which is for requesting the target node to allocate the resource for the redirection and is sent by the coordinator, allocate the resource for the redirection to perform resource preparation for the redirection. The tenth sending module 1806 is configured to notify the coordinator of a resource allocation result of the redirection.

The target node 180 in this embodiment may be configured to implement the functions of the target node in the embodiment of FIG. 11A, FIG. 12A or FIG. 13. The target node 180 may be an eNB, a Node B, an RNC or a BSS.

Figure 19A:
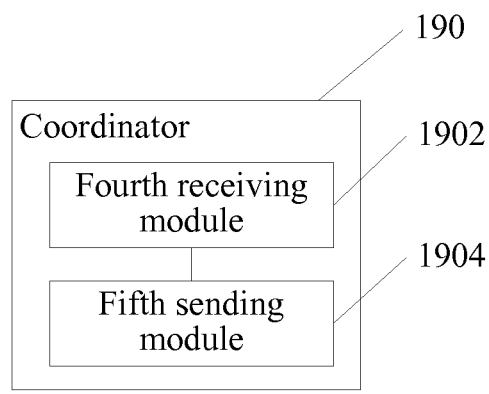
FIG. 19A is a schematic structural diagram of a coordinator according to an embodiment of the present invention.

Referring to FIG. 19A, FIG. 19A is a schematic structural diagram of a coordinator according to an embodiment of the present invention. The coordinator 190 includes:

A fourth receiving module 1902 is configured to receive a message which is for requesting resource preparation for a handover and is sent by a serving node, and a message which is for notifying the coordinator of a resource allocation result of redirection and is sent by a target node after the target node allocates a resource for the redirection.

The fifth sending module 1904 is configured to, after the fourth receiving module 1902 receives the message for requesting the resource preparation for the handover, send, to the target node, a message for requesting the target node to allocate the resource for the redirection, and configured to, after the fourth receiving module 1902 receives the message for notifying the coordinator of the resource allocation result of the redirection, send, to the serving node, a message for notifying the serving node of the resource preparation on the target node.

The coordinator 190 in this embodiment may be configured to execute the steps executed by the coordinator in the embodiment of FIG. 13.

Figure 19B:
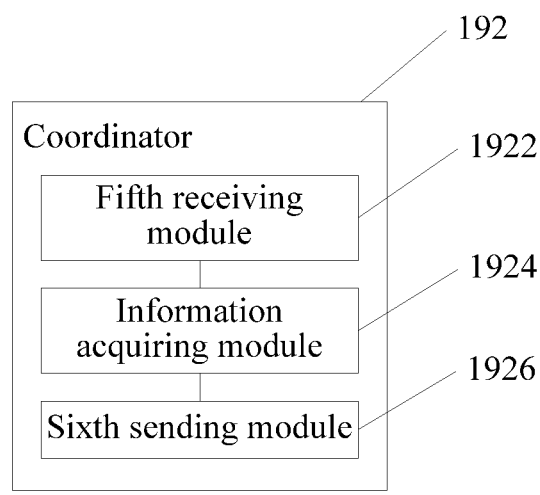
FIG. 19B is a schematic structural diagram of a coordinator according to an embodiment of the present invention.

Referring to FIG. 19B, FIG. 19B is a schematic structural diagram of a coordinator according to an embodiment of the present invention. The coordinator 192 includes the following modules.

A fifth receiving module 1922 is configured to receive a second handover notification sent by a serving node of a serving cell where a UE is located, where the second handover notification includes an identifier, and the identifier is used for notifying the coordinator to send, to the serving node, information reflecting a load condition of at least one neighboring cell among a plurality of neighboring cells of the serving cell where the UE is located.

An information acquiring module 1924 is configured to acquire the information reflecting the load condition of the at least one neighboring cell among the plurality of neighboring cells.

The sixth sending module 1926 is configured to send, to the serving node, a second handover notification response, so that the serving node determines a target node of a handover, where the second handover notification response includes the information reflecting the load condition of the at least one neighboring cell among the plurality of neighboring cells.

The coordinator 192 in this embodiment may be configured to execute the steps executed by the coordinator in the embodiment of FIG. 10.

Figure 19C:
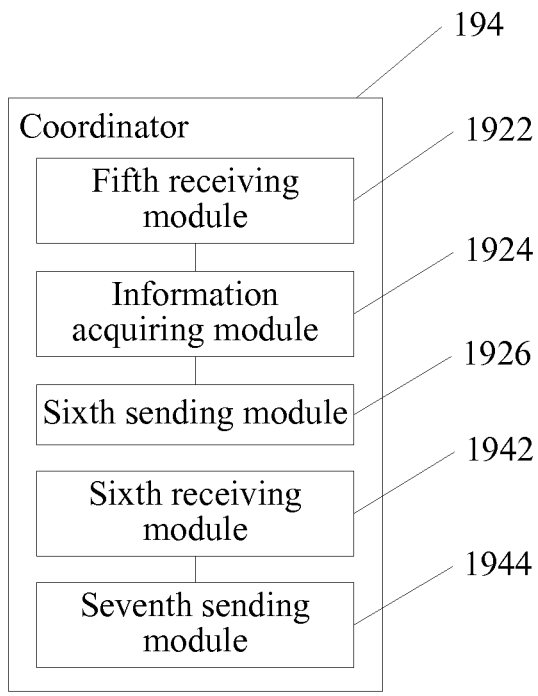
FIG. 19C is a schematic structural diagram of a coordinator according to an embodiment of the present invention.

Referring to FIG. 19C, FIG. 19C is a schematic structural diagram of a coordinator according to an embodiment of the present invention. The coordinator 194 includes all modules and functions in the embodiment of FIG. 19B, and includes:

A sixth receiving module 1942 is configured to receive a message which is for requesting resource preparation for a handover and is sent by a serving node, and a message which is for notifying the coordinator of a resource allocation result of redirection and is sent by a target node after the target node allocates a resource for the redirection.

A seventh sending module 1944 is configured to, after the sixth receiving module 1942 receives the message for requesting the resource preparation for the handover, send, to the target node, a message for requesting the target node to allocate the resource for the redirection, and configured to, after the sixth receiving module 1942 receives the message for notifying the coordinator of the resource allocation result of the redirection, send, to the serving node, a message for notifying the serving node of the resource preparation on the target node.

The coordinator 194 in this embodiment may be configured to execute the steps executed by the coordinator in the embodiment of FIG. 12A.

Figure 20A:
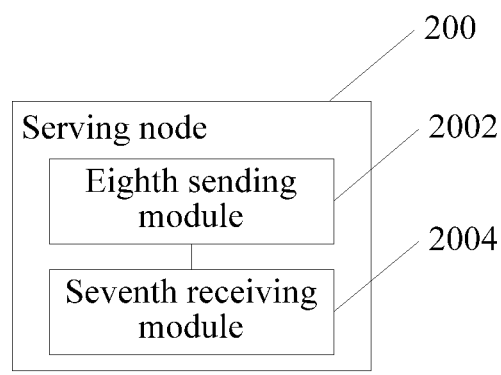
FIG. 20A is a schematic structural diagram of a serving node according to an embodiment of the present invention.

Referring to FIG. 20A, FIG. 20A is a schematic structural diagram of a serving node according to an embodiment of the present invention. The serving node 200 includes: an eighth sending module 2002 and a seventh receiving module 2004.

The eighth sending module 2002 is configured to send, to a coordinator, a first handover notification (the first handover notification includes measurement results of a plurality of neighboring cells of a serving cell where the serving node is located), so that the coordinator determines a target node of a handover. The seventh receiving module 2004 is configured to receive a message which is for notifying the serving node of resource preparation on the target node and is sent by the coordinator (for example, a handover command). In this case, the serving node 200 may be configured to execute the steps executed by the serving node in the embodiment of FIG. 11A, and the serving node 200, the foregoing coordinator 152, and the foregoing target node 180 may form a communications system.

Alternatively, the eighth sending module 2002 is configured to send, to a coordinator, a first handover notification (the first handover notification includes measurement results of a plurality of neighboring cells of a serving cell where the serving node is located), so that the coordinator determines a target node of a handover. The seventh receiving module 2004 is configured to receive a first handover notification response sent by the coordinator after the coordinator determines the target node, where the first handover notification response includes an identifier of the target cell. In this case, the serving node 200 not only may adopt the prior art for subsequent signaling transmission (in this case, the communications system may include a serving node 200 and the foregoing coordinator 160), but also may perform the following operations: The eighth sending module 2002 sends, to the coordinator, a message for requesting resource preparation for a handover, so that the coordinator requests the target node to allocate a resource for redirection. The seventh receiving module 2004 receives the message which is for notifying the serving node of the resource preparation on the target node and is sent by the coordinator. In this case, the serving node 200 may be configured to execute the steps executed by the serving node in the embodiment of FIG. 12A, and the serving node 200, the foregoing coordinator 162, and the foregoing target node 180 may form a communications system.

Figure 20B:
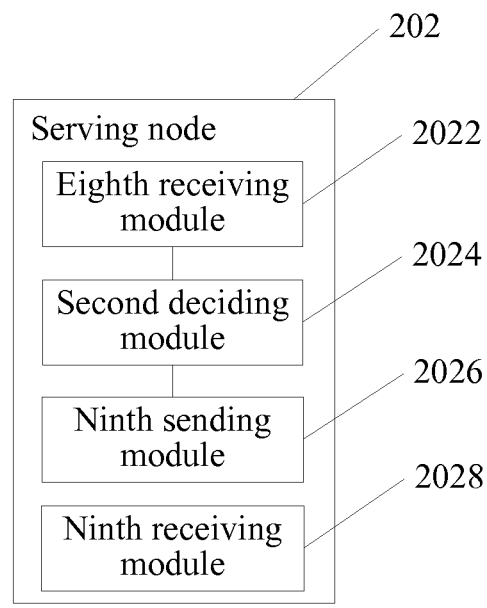
FIG. 20B is a schematic structural diagram of a serving node according to an embodiment of the present invention.

Referring to FIG. 20B, FIG. 20B is a schematic structural diagram of a serving node according to an embodiment of the present invention. The serving node 202 includes the following modules.

An eighth receiving module 2022 is configured to receive measurement results which are of a plurality of neighboring cells of a serving cell where a UE is located and are reported by the UE.

A second deciding module 2024 is configured to perform a handover decision according to the measurement results which are of the plurality of neighboring cells of the serving cell where the UE is located (that is, the serving cell where the serving node 202 is located) and are reported by the UE, to determine a target node.

A ninth sending module 2026 is configured to, after the second deciding module 2024 determines the target node, send, to a coordinator, a message for requesting resource preparation for a handover (for example, a handover request in the embodiment of FIG. 13), so that the coordinator requests the target node to allocate a resource for redirection.

A ninth receiving module 2028 is configured to, after the target node notifies the coordinator of a resource allocation result of the redirection, receive a message which is for notifying the serving node of the resource preparation on the target node (for example, the handover command in the embodiment of FIG. 13) and is sent by the coordinator redirection. In this case, the serving node 202 may be configured to execute the steps executed by the serving node in the first implementation manner in the embodiment of FIG. 13, and the serving node 202, the foregoing coordinator 190, and the foregoing target node 180 may form a communications system.

The serving node 200 in FIG. 20A and the serving node 202 in FIG. 20B may be an eNB, a Node B, an RNC or a BSS.

For description of the messages in the embodiments of FIG. 18, FIG. 19A, FIG. 19B, FIG. 19C, FIG. 20A, and FIG. 20B, reference may be made to the corresponding description of the embodiments of FIG. 11A and FIG. 12A.

Figure 21:
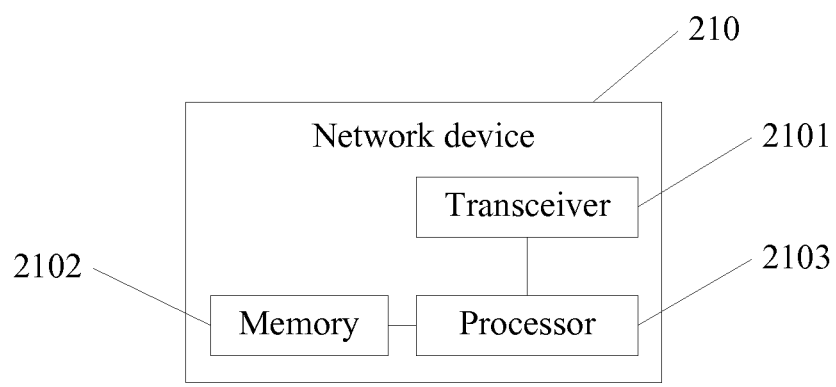
FIG. 21 is a schematic structural diagram of a network device according to an embodiment of the present invention.

FIG. 21 is a schematic structural diagram of a network device according to one embodiment of the present invention. The network device 210 includes: a transceiver 2101, a memory 2102, and a processor 2103.

The network device 210 may be a coordinator. In this case, the transceiver 2101 may be configured to communicate with outside, for example, receive a first handover notification or a second handover notification sent by a serving node, acquire load information of a neighboring cell, send, to the serving node, a first handover notification response or a second handover notification response, receive a handover request sent by the serving node and send a redirection request to a target node, receive a redirection request response sent by the target node and send a handover request response to the serving node, send a handover command to the serving node, and the like. The memory 2102 is coupled to the processor 2103. The memory 2102 is configured to store various programs and applications, and may further be configured to store the acquired load information of the neighboring cell and the like. The processor 2103 is configured to implement a function such as a handover decision according to the information received by the transceiver 2101 and by invoking programs, applications or other data stored in the memory 2102.

The network device 210 may further be a serving node (for example, an eNB, a Node B, an RNC or a BSS). In this case, the transceiver 2101 may be configured to communicate with outside, for example, receive a measurement report of a neighboring cell reported by a UE, send, to a coordinator, a first handover notification or a second handover notification, receive a first handover notification response or a second handover notification response sent by the coordinator, send a handover request to the coordinator and receive a handover request response sent by the coordinator, and the like. The memory 2102 is coupled to the processor 2103. The memory 2102 is configured to store various programs and applications, and may further be configured to store acquired load information of a neighboring cell and the like. The processor 2103 is configured to implement a function such as a handover decision according to the information received by the transceiver 2101 and by invoking programs, applications or other data stored in the memory 2102.

The network device 210 may further be a target node (for example, an eNB, a Node B, an RNC or a BSS). In this case, the transceiver 2101 may be configured to communicate with outside, for example, receive a handover request or a redirection request sent by a coordinator; send a handover request response or a redirection response to the coordinator, and the like. The memory 2102 is coupled to the processor 2103. The memory 2102 is configured to store various programs and applications. The processor 2103 is configured to implement a function such as redirection resource preparation according to the information received by the transceiver 2101 and by invoking programs or applications stored in the memory 2102.

In the network device 210, the processor 2103 may further be configured to implement other functions of the serving node, the coordinator, and the target node in the embodiments of FIG. 2 to FIG. 14.

An embodiment of the present invention further provides a communications system. The communications system may include the following of the embodiments of present invention:

the serving node 200 and the coordinator 160; or include:
the serving node 170 and the coordinator 192; or include:
the serving node 200, the coordinator 152, and the target node 180; or include:
the serving node 200, the coordinator 162, and the target node 180; or include:
the serving node 172, the coordinator 194, and the target node 180; or include:
the serving node 202, the coordinator 190, and the target node 180.

For description of all devices in the communications system and the steps of signaling exchange between the devices, reference may be made to the corresponding description of the foregoing device embodiments and method embodiments, and details are no longer described in detail here.

A person of ordinary skill in the art may understand that all or a part of the processes of the methods in the foregoing embodiments may be implemented by a computer program instructing relevant hardware. The program may be stored in a computer readable storage medium. When the program runs, the processes of the foregoing methods in the embodiments are performed. The storage medium may be a magnetic disk, an optical disk, a read-only memory (Read-Only Memory, ROM), or a random access memory (Random Access Memory, RAM), or the like.

The foregoing disclosed description is merely exemplary embodiments of the present invention, but is not intended to limit the scope of the claims of the embodiments of present invention. Therefore, equivalent variations made according to the claims of the embodiments of present invention shall fall within the protection scope of the embodiments of present invention.

What is claimed is:

1. An inter-radio access technology handover method comprising:
   acquiring, by a network-side device, measurement results of a plurality of neighboring cells of a serving cell where a user equipment (UE) is located, wherein the network-side device is separate from the UE, wherein the measurement results indicate a signal quality for one or more neighboring cells of the plurality of neighboring cells;
   acquiring, by the network-side device, information reflecting a load condition of at least one neighboring cell among the plurality of neighboring cells, the load condition indicating load information and remaining resource information of the at least one neighboring cell among the plurality of neighboring cells; and
   performing, by the network-side device, a handover decision for the UE according to the measurement results of the plurality of neighboring cells and the information reflecting the load condition of the at least one neighboring cell among the plurality of neighboring cells, wherein the handover decision determines a target cell from the plurality of neighboring cells for handover, wherein the target cell is selected by randomly selecting a cell which meets both a signal quality threshold and a load condition threshold.

2. The method according to claim 1, wherein acquiring the measurement results comprises receiving, by a coordinator, a first handover notification sent by a serving node, wherein the first handover notification comprises the measurement results of the plurality of neighboring cells of the serving cell where the UE is located;
   wherein acquiring the information reflecting the load condition comprises acquiring, by the coordinator, the information reflecting the load condition of the at least one neighboring cell among the plurality of neighboring cells; and
   wherein performing the handover decision comprises determining, by the coordinator, a target cell according to the measurement results of the plurality of neighboring cells and the information reflecting the load condition of the at least one neighboring cell among the plurality of neighboring cells.

3. The method according to claim 2, wherein the method further comprises sending, by the coordinator, a first handover notification response to the serving node, wherein the first handover notification response comprises an identifier of the target cell.

4. The method according to claim 3, wherein the method further comprises:
   receiving, by the coordinator, a first message that requests resource preparation for a handover, the first message being sent by the serving node;
   sending, by the coordinator to a target node of the target cell, a message for requesting the target node to allocate a resource for redirection;
   receiving, by the coordinator, a second message that notifies the coordinator of a resource allocation result of the redirection, the second message being sent by the target node after the target node allocates the resource for the redirection; and sending, by the coordinator, to the serving node, a message for notifying the serving node of the resource preparation on the target node.

5. The method according to claim 2, wherein the method further comprises:

sending, by the coordinator to a target node of the target cell, a message for requesting the target node to allocate a resource for redirection;

receiving, by the coordinator, a message to notify the coordinator of a resource allocation result of the redirection, the message being sent by the target node after the target node allocates the resource for the redirection; and sending, by the coordinator to the serving node, a message notifying the serving node of resource preparation on the target node.

6. The method according to claim 1, wherein acquiring the measurement results comprises receiving, by a serving node, the measurement results which are of the plurality of neighboring cells of the serving cell where the UE is located and are reported by the UE;

wherein acquiring the information reflecting the load condition comprises sending, by the serving node, a handover notification to a coordinator and receiving, by the serving node, a handover notification response sent by the coordinator, wherein the handover notification response comprises the information reflecting the load condition of the at least one neighboring cell among the plurality of neighboring cells; and wherein performing the handover decision comprises determining, by the serving node, a target cell according to the measurement results of the plurality of neighboring cells and the information reflecting the load condition of the at least one neighboring cell among the plurality of neighboring cells.

7. The method according to claim 6, wherein the handover notification comprises an identifier that is used for notifying the coordinator to send, to the serving node, the information reflecting the load condition of the at least one neighboring cell among the plurality of neighboring cells.

8. The method according to claim 6, wherein the serving node comprises an eNB, a Node B, an RNC, or a BSS.

9. The method according to claim 5, wherein the target node comprises an eNB, a Node B, an RNC or a BSS.

10. The method according to claim 1, wherein the information reflecting the load condition of the at least one neighboring cell among the plurality of neighboring cells comprises:

load information and remaining resource information of the at least one neighboring cell; or a target cell list generated according to load information and remaining resource information of the at least one neighboring cell.

11. A network device comprising:
a processor; and
a non-transitory computer-readable storage medium storing a program to be executed by the processor, the program including instructions for:

acquiring measurement results of a plurality of neighboring cells of a serving cell where a user equipment (UE) is located, wherein the network device is separate from the UE, wherein the network device is on a network-side of the serving cell, wherein the measurement results indicate a signal quality for one or more neighboring cells of the plurality of neighboring cells;

acquiring information reflecting a load condition of at least one neighboring cell among the plurality of neighboring cells, wherein the information reflecting a load condition is different from the measuring results, wherein the load condition indicates load information and remaining resource information of the at least one neighboring cell among the plurality of neighboring cells; and performing a handover decision for the UE according to the measurement results of the plurality of neighboring cells and the information reflecting the load condition of the at least one neighboring cell among the plurality of neighboring cells, wherein the handover decision determines a target cell from the plurality of neighboring cells for handover, wherein the target cell is selected by randomly selecting a cell which meets both a signal quality threshold and a load condition threshold.

12. The network device according to claim 11, wherein the network device is a coordinator and wherein the program includes instructions for:

receiving a first handover notification sent by a serving node, wherein the first handover notification comprises the measurement results of the plurality of neighboring cells of the serving cell where the UE is located;

acquiring the information reflecting the load condition of the at least one neighboring cell among the plurality of neighboring cells; and determining a target cell according to the measurement results of the plurality of neighboring cells and the information reflecting the load condition of the at least one neighboring cell among the plurality of neighboring cells.

13. The network device according to claim 12, wherein the program includes instructions for sending, to the serving node, a first handover notification response, wherein the first handover notification response comprises an identifier of the target cell.

14. The network device according to claim 13, wherein the program includes instructions for:

receiving a message sent by the serving node requesting resource preparation for a handover;

receiving a message sent by a target node of the target cell after the target node allocates a resource for redirection, the message notifying the coordinator of a resource allocation result of redirection;

sending, to the target node, a message requesting the target node to allocate the resource for the redirection; and sending, to the serving node, a message notifying the serving node of the resource preparation on the target node.

15. The network device according to claim 12, wherein the program includes instructions for:

sending, to a target node of the target cell, a message for requesting the target node to allocate a resource for redirection;

receiving a message that notifies the coordinator of a resource allocation result of the redirection and is sent by the target node after the target node allocates the resource for the redirection; and sending, to the serving node, a message to notify the serving node of resource preparation on the target node.

16. The network device according to claim 11, wherein the network device is a serving node and wherein the program includes instructions for:
- receiving the measurement results of the plurality of neighboring cells of the serving cell where the UE is located and are reported by the UE;
- sending, to a coordinator, a handover notification;
- receiving a handover notification response sent by the coordinator, wherein the handover notification response comprises the information reflecting the load condition of the at least one neighboring cell among the plurality of neighboring cells; and
- determining a target cell according to the measurement results of the plurality of neighboring cells and the information reflecting the load condition of the at least one neighboring cell among the plurality of neighboring cells.

17. The network device according to claim 16, wherein the handover notification comprises an identifier, and the identifier is used to notify the coordinator to send, to the serving node, the information reflecting the load condition of the at least one neighboring cell among the plurality of neighboring cells.

18. The network device according to claim 16, wherein the program includes instructions for:
- sending, to the coordinator, a message for requesting resource preparation for a handover, so that the coordinator requests a target node of the target cell to allocate a resource for redirection; and
- receiving a message for notifying the serving node of the resource preparation on the target node, the message being sent by the coordinator after the target node notifies the coordinator of a resource allocation result of the redirection.

19. The network device according to claim 11, wherein the information reflecting the load condition of the at least one neighboring cell among the plurality of neighboring cells comprises:
- load information and remaining resource information of the at least one neighboring cell; or
- a target cell list generated according to load information and remaining resource information of the at least one neighboring cell.

20. A coordinator, comprising:
- a processor; and
- a non-transitory computer-readable storage medium storing a program to be executed by the processor, the program including instructions for:
  - performing a handover decision comprising selecting a target cell for a handover, wherein selecting the target cell comprises:
    - determining a first set of neighboring cells which have a signal quality meeting a signal quality threshold,
    - determining a second set of neighboring cells which have a load condition meeting a load condition threshold, and
    - determining the target cell by determining an intersection of cells from the first set and the second set and randomly selecting a cell from the intersection of cells;
  - receiving, from a serving node, a first message requesting resource preparation for the handover;
  - after receiving the first message, sending, to a target node of the target cell, a second message requesting the target node to allocate a resource for redirection;
  - after the target node allocates the resource for the redirection, receiving, from the target node, a third message notifying the coordinator of the resource allocation result of the redirection; and
  - after receiving the third message, sending, to the serving node, a fourth message notifying the serving node of the resource preparation on the target node redirection, wherein the coordinator is a separate device from a user equipment (UE), and wherein the coordinator is on a network-side of the serving node.

\* \* \* \* \*